(12) United States Patent
Kriege et al.

(10) Patent No.: US 7,310,872 B2
(45) Date of Patent: Dec. 25, 2007

(54) COMPUTER ENCLOSURE

(75) Inventors: Michael Kriege, San Jose, CA (US);
Dan Hong, Sunnyvale, CA (US); John DiFonzo, Emerald Hill, CA (US);
Stephen Zadesky, Redwood City, CA (US); David Lynch, Boulder Creek, CA (US); David Lundgren, Mill Valley, CA (US); Nick Merz, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 10/928,780

(22) Filed: Aug. 27, 2004

(65) Prior Publication Data

US 2005/0023022 A1 Feb. 3, 2005

Related U.S. Application Data

(62) Division of application No. 09/821,784, filed on Mar. 28, 2001, now Pat. No. 7,012,189.

(51) Int. Cl.
 *H01R 43/00* (2006.01)
(52) U.S. Cl. .......................... 29/825; 29/832; 29/842; 29/844; 29/855
(58) Field of Classification Search .................. 29/825, 29/832, 842, 844, 855, 840
See application file for complete search history.

(56) References Cited

U.S. PATENT DOCUMENTS 3,555,168 A * 1/1971 Frykberg .................... 174/374

| 4,319,795 | A |   | 3/1982  | Klaus |
|-----------|---|---|---------|-------|
| 4,831,498 | A | * | 5/1989  | Baba ........................... 361/816 |
| 4,832,349 | A | * | 5/1989  | Kawai et al. ................ 277/591 |
| 4,873,022 | A |   | 10/1989 | Ogawa et al. |
| 5,008,485 | A | * | 4/1991  | Kitagawa ..................... 174/356 |
| 5,008,486 | A |   | 4/1991  | Terakawa et al. |
| 5,128,835 | A | * | 7/1992  | Rudy et al. ................. 361/818 |
| 5,164,542 | A | * | 11/1992 | Hart ...................... 174/35 MS |
| 5,176,853 | A |   | 1/1993  | Sarma et al. |

(Continued)

FOREIGN PATENT DOCUMENTS

JP           11-145440       *   5/1999

(Continued)

OTHER PUBLICATIONS

Fujitsu, "Fujitsu Introduces INTERTOP CS3000, New Windows CE Handheld PC", Japanese Press Release, May 18, 1999, 3 pages.

(Continued)

*Primary Examiner*—Carl J. Arbes
(74) *Attorney, Agent, or Firm*—Beyer Weaver LLP

(57) ABSTRACT

A computing device having an improved enclosure arrangement is disclosed. One aspect of the enclosure pertains to enclosure parts that are structurally bonded together to form a singular composite structure. In one embodiment, structural glue is used to bond at least two unique parts together. Another aspect of the enclosure pertains to enclosure parts that are electrically bonded together to form a singular integrated conductive member. In one embodiment, conductive paste is used to bond at least two unique parts together. The improved enclosure is particularly useful in portable computing devices such as laptop computers.

29 Claims, 11 Drawing Sheets

U.S. PATENT DOCUMENTS

| | | | |
|---|---|---|---|
| 5,364,196 A | | 11/1994 | Baitz et al. |
| 5,574,625 A | | 11/1996 | Ohgami et al. |
| 5,666,261 A | * | 9/1997 | Aguilera .................... 361/681 |
| 5,687,055 A | | 11/1997 | Miki |
| 5,731,541 A | * | 3/1998 | Bernd et al. ........... 174/35 GC |
| 5,731,963 A | * | 3/1998 | Heiss et al. .................. 361/814 |
| 5,847,317 A | * | 12/1998 | Phelps ........................ 174/368 |
| 5,946,194 A | | 8/1999 | Dudas et al. |
| 6,125,029 A | | 9/2000 | Sasaki et al. |
| 6,266,240 B1 | | 7/2001 | Urban et al. |
| 6,303,854 B1 | | 10/2001 | Papaleo et al. |
| 6,323,418 B1 | * | 11/2001 | Tiburtius et al. .......... 174/35 R |
| 6,483,719 B1 | * | 11/2002 | Bachman .................... 361/816 |
| 6,547,252 B1 | * | 4/2003 | Kahl et al. ................... 277/590 |
| 6,574,096 B1 | * | 6/2003 | Difonzo et al. ............. 361/683 |

FOREIGN PATENT DOCUMENTS

| | | |
|---|---|---|
| WO | 99/47993 | 9/1999 |

OTHER PUBLICATIONS

IBM, "IBM Introduces the ThinkPad A Series and ThinkPad T Series," Research Triangle Park, N.C., U.S., May 1, 2000, 3 pages.

PCT International Search Report for PCT Int'l Appln. No. US 01/42362 mailed Dec. 20, 2002, 7 pages.

"Be 6 Dispenser Material", APM Bavaria GmbH, 1999.

* cited by examiner

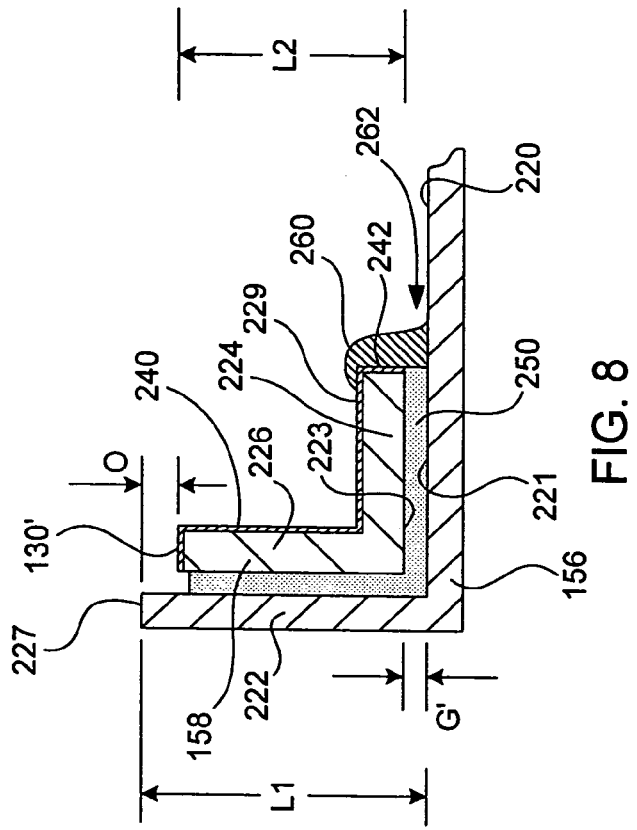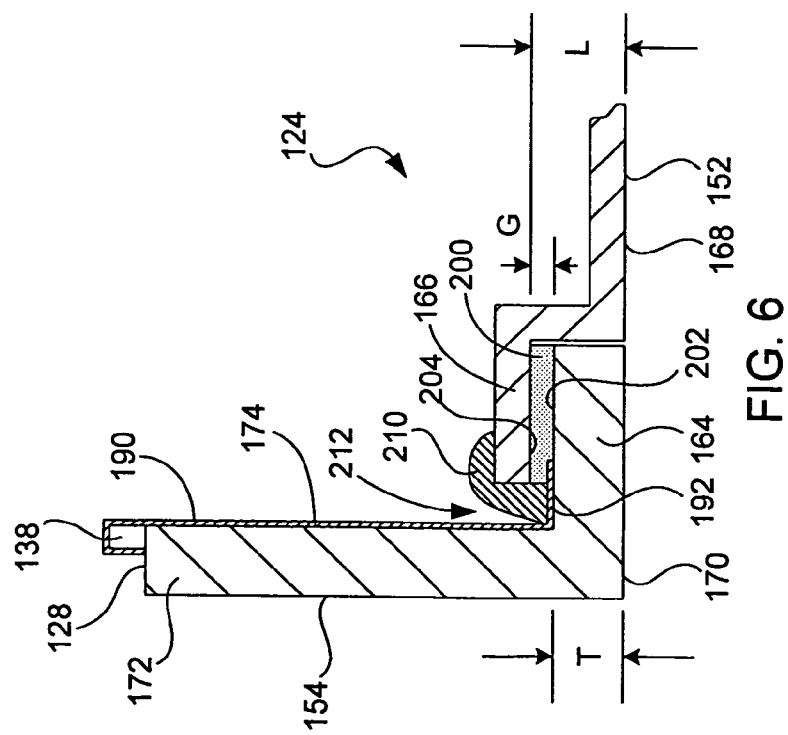

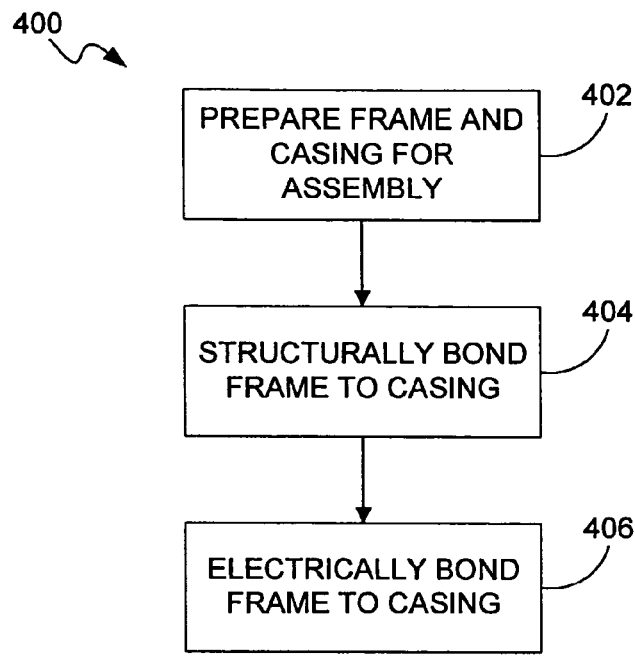
FIG. 9
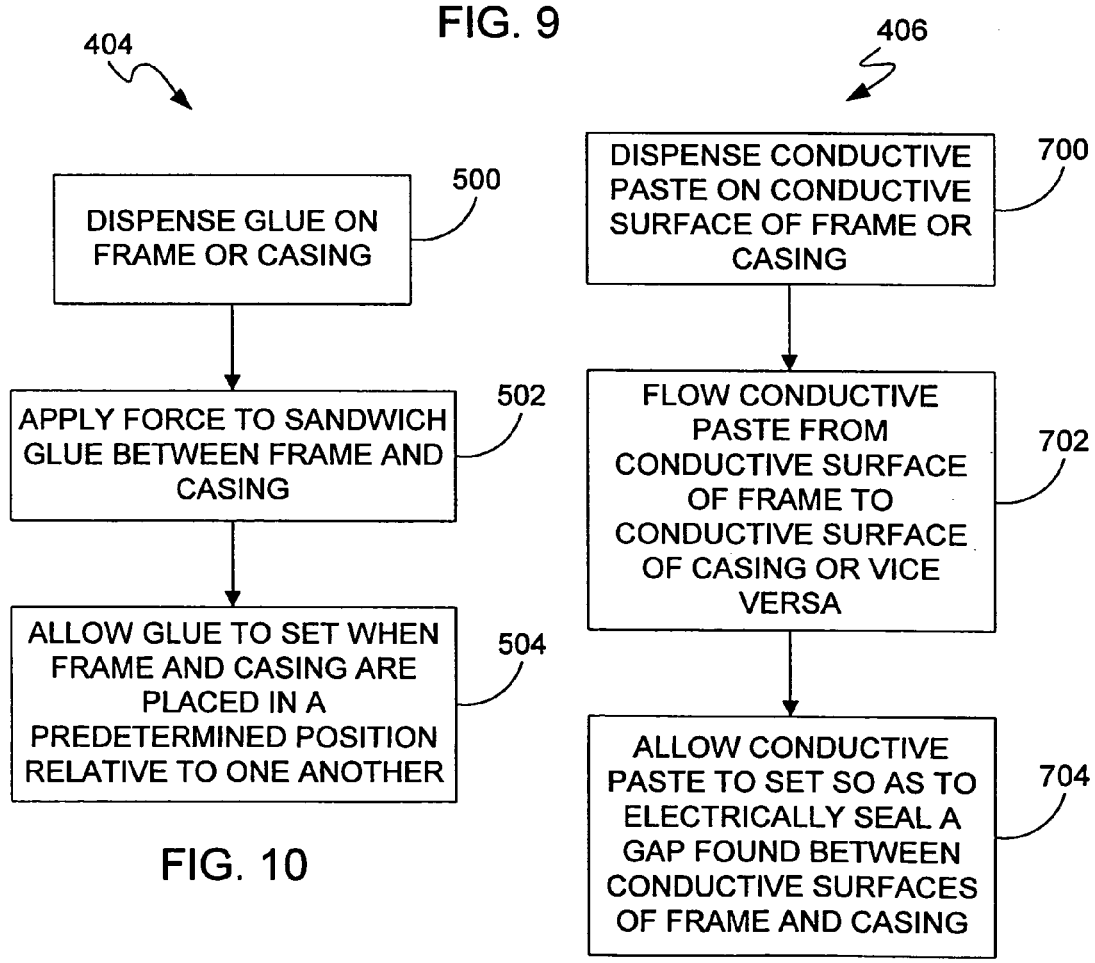
FIG. 10
FIG. 13

COMPUTER ENCLOSURE

RELATED APPLICATIONS

This application is a divisional of prior U.S. application Ser. No. 09/821,784, entitled "COMPUTER ENCLOSURE", filed on Mar. 28, 2001 now U.S. Pat. No. 7,012,189, which is herein incorporated by reference.

BACKGROUND OF THE INVENTION

The present invention relates generally to a computer device. More particularly, the present invention relates to enclosures for use in a computer device.

In recent years portable computers have become thin, light and powerful. One factor contributing to this phenomena is in the manufacturer's ability to fabricate various components of the computer in smaller and smaller sizes while in most cases increasing the power and or operating speed of such components.

The trend of thinner, lighter and powerful presents a continuing design challenge in the design of some components associated with the portable computer. For example, one design challenge associated with the portable computer is the design of the enclosures used to house the various internal components of the portable computer. This design challenge generally arises from two conflicting design goals—the desirability of making the enclosure lighter and thinner, and the desirability of making the enclosure stronger and more rigid. In most portable computers, the enclosures are mechanical assemblies having parts that are screwed, riveted, snapped or otherwise fastened together at discrete points. The lighter enclosures, which use thinner plastic structures and less fasteners, tend to be more flexible and therefore they have a greater propensity to buckle and bow when used while the stronger and more rigid enclosures, which use thicker plastic structures and more fasteners, tend to be thicker and carry more weight. Unfortunately, increased weight may lead to user dissatisfaction, and bowing may damage the internal parts of the portable computer.

Furthermore, as the power and sophistication of integrated circuit devices have increased, so has the level of electromagnetic interference generated by such devices, i.e., integrated circuit devices unintentionally emit electromagnetic radiation during operation that may cause interference with communication devices, such as telephones, radios, and televisions. In order to prevent interference, the enclosures are often shielded with an electrically conductive material to block the emission of electromagnetic radiation, which is emanating from the integrated circuit devices. By way of example, some methods for shielding the enclosure include: lining the plastic enclosure with a metallic foil such as aluminum, lining the plastic enclosure with sheet metal such as steel, and coating the inner surfaces of the plastic enclosure with a metallic material such as nickel or copper. Additionally, silicone based electrically conductive EMI gaskets may be formed in place between two parts of the enclosure before an enclosure is assembled. Such electrically conductive EMI gaskets are commonly known as Form-In-Place. As is generally well known, form-in-place gaskets must be compressed up to 40% in order to achieve an enclosure capable of containing electronic emissions.

Although current enclosure designs work well, in many instances it would be desirable to provide enclosures that are thinner, lighter, stronger and aesthetically more pleasing than current enclosure designs.

SUMMARY OF THE INVENTION

The invention relates, in one embodiment, to a computing device. The computing device includes a first member having a first structural element and a first conductive element. The computing device further includes a second member having a second structural element and a second conductive element. The computing device additionally includes a means for electrically and structurally coupling the elements of the first and second members together.

The invention relates, in another embodiment, to a component of a computer enclosure. The component includes a first structural member and a second structural member. The component further includes an adhesive disposed between the first and second members, the adhesive structurally attaching the first and second members to form a singular composite structure.

The invention relates, in another embodiment, to a component of a computer enclosure. The component includes a first member having a first conductive surface. The component further includes a second member having a second conductive surface. The component additionally includes a conductive bridge electrically connecting the first and second conductive surfaces and electrically sealing an interface between the first and second conductive surfaces so as to form a singular conductive structure for shielding electronic emissions.

The invention relates, in another embodiment, to a portable computer enclosure. The portable computer enclosure includes a first case configured to at least partially enclose internal components of the portable computer. The first case includes a first member formed from a first material and a second member formed from a second material that is different than the first material. The first member is structurally glued to the second member to form a first composite structure. The glue has properties that allow it to compensate for tolerances in the first and second members so as to produce a desired first case dimension.

The invention relates, in another embodiment, to a method of forming a computer enclosure. The method includes providing a casing and a frame. The method further includes structurally bonding the frame to the casing via glue. The method additionally includes electrically bonding the frame to the casing via a conductive paste.

The invention relates, in another embodiment, to a method of forming a computer enclosure by structurally bonding a first member to a second member. The method includes dispensing a glue between the first and second members. The method further includes applying a force to sandwich the glue between the first and second members. The method additionally includes allowing the glue to cure when the first and second members are placed in a predetermined position relative to one another so as to form a singular composite structure.

The invention relates, in another embodiment, to a method of forming a computer enclosure by electrically bonding a first member to a second member. The method includes dispensing a conductive paste on a first conductive surface of the first or second member. The method further includes flowing the conductive paste from the first conductive surface of the first or second member to a second conductive surface of the first or second member. The method additionally includes allowing the conductive paste to cure so as to electrically seal an interface between the first and second conductive surfaces of the first or second member.

BRIEF DESCRIPTION OF THE DRAWINGS

The invention may best be understood by reference to the following description taken in conjunction with the accompanying drawings in which:

FIG. 6 is a side view, in cross section, of the top casing of FIG. 5 (taken along line 6–6'), in accordance with one embodiment of the present invention.

FIG. 8 is a side view, in cross section, of the top casing of FIG. 7 (taken along line 8–8'), in accordance with one embodiment of the present invention.

FIG. 9 is a flow diagram showing a method of constructing an enclosure, in accordance with one embodiment of the present invention.

FIG. 10 is a flow diagram showing a method for structurally bonding a frame to a casing, in accordance with one embodiment of the present invention.

FIG. 13 is a flow diagram showing a method for electrically bonding a frame to a casing, in accordance with one embodiment of the present invention.

DETAILED DESCRIPTION OF THE INVENTION

The invention generally pertains to a computing device. More particularly, the invention pertains to an improved enclosure arrangement for use in the computing device. One aspect of the invention pertains to an enclosure having at least two unique parts that are structurally bonded together to form a singular composite structure. In one embodiment, structural glue is used to bond the two unique parts together. Another aspect of the invention pertains to an enclosure having at least two unique parts that are electrically bonded together to form a singular integrated conductive member. In one embodiment, conductive paste is used to bond the two unique parts together. The invention is particularly useful in portable computing devices such as laptop computers.

Embodiments of the invention are discussed below with reference to FIGS. 1–15. However, those skilled in the art will readily appreciate that the detailed description given herein with respect to these figures is for explanatory purposes as the invention extends beyond these limited embodiments.

Figure 1:
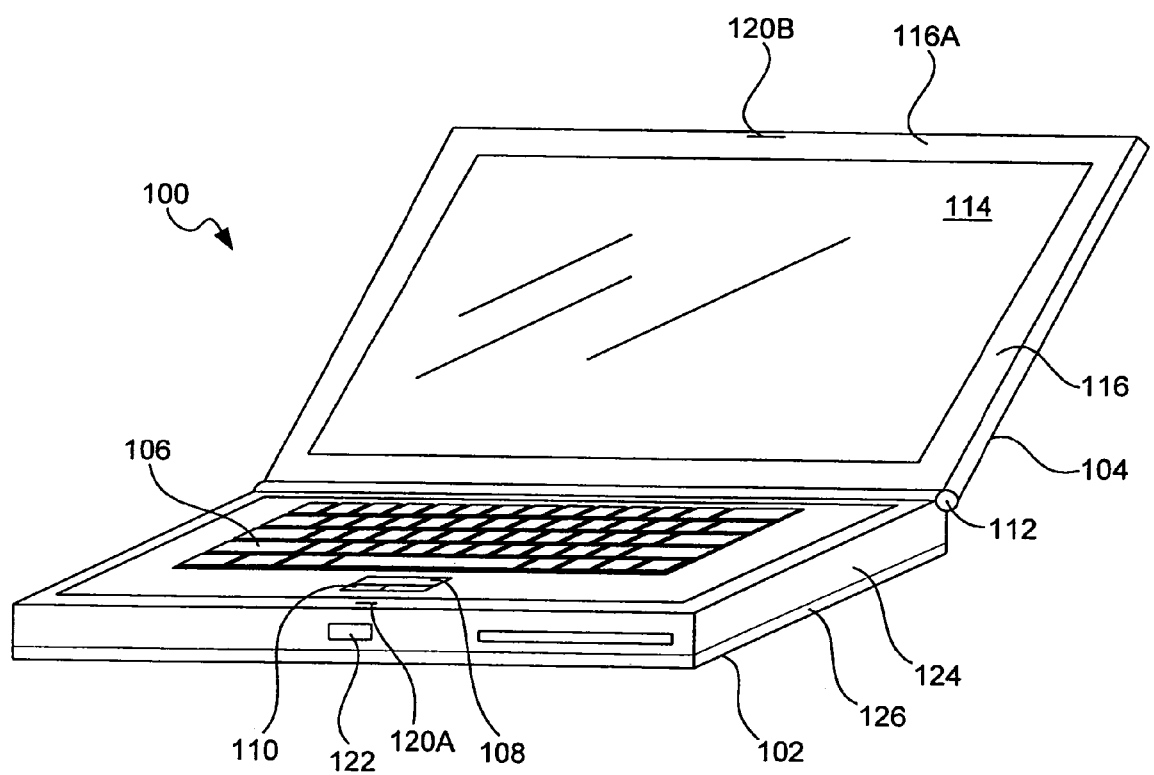
FIG. 1 is a perspective diagram of a portable computer, in accordance with one embodiment of the present invention.

FIG. 1 is a perspective diagram of a portable computer 100, in accordance with one embodiment of the invention. The portable computer 100 generally includes a base 102 and a lid 104. The base 102 is configured to enclose various integrated circuit chips and other circuitry that provide computing operations for the portable computer 100. By way of example, the integrated circuit chips and other circuitry may include a microprocessor, Read-Only Memory (ROM), Random-Access Memory (RAM), a disk drive, a battery, and various input/output support devices. The base 102 is also configured to enclose various structural members for supporting the base 102. For example, the structural members may include ribs, bars, frames and the like. The internal components of the base 102 are generally surrounded at a peripheral region by a top case 124 and a bottom case 126 that serve to support the internal components in their assembled position within the base 102. In some instances, the integrated circuit chips and other circuitry may generate unwanted electrical emissions (EMI), and therefore, the base 102, and more particularly the top and bottom cases 124 and 126, is also configured to contain electronic emissions therein. This will be described in greater detail below.

The base 102 is also arranged to hold a plurality of input devices such as a keyboard 106, a track pad 108 and button(s) 110. The keyboard 106, which includes a plurality of keys, allows a user of the portable computer 100 to enter alphanumeric data. The track pad 108 allows a user to move an input pointer on a graphical user interface. Button(s) 110 allows a user to make a selection on the graphical user interface. As shown, the track pad 108 and button(s) 110 are located in a front portion (or palm rest) of the base 102, and the keyboard 106 is located in a back portion of the base 102.

In one embodiment, the keyboard 106 is arranged to be a modular unit that is movable relative to the base 102. That is, the keyboard 106 is movable such that it can be coupled to and/or de-coupled from the base 102. In one implementation, the movable keyboard is arranged to act as a trap door that covers an opening in the base. The opening allows user access to various internal components enclosed inside the base. As such, the keyboard 106 is adapted to move between a mounting condition, which secures the keyboard to the base and which prevents access through the opening, and a removal condition, which enables removal of the keyboard from the base and which allows access through the opening. By way of example, a movable keyboard system, which may be used in the portable computer 100, may be found in U.S. patent application Ser. No. 09/405,552, filed on Sep. 24, 1999, and U.S. patent application Ser. No. 09/755,625, filed on Jan. 4, 2001, both of which are herein incorporated by reference.

The lid 104 is pivotally coupled to the base 102 via a hinge mechanism 112. As such, the lid 104 may rotate into an open position (as shown) or a closed position (not shown) relative to the base 102. The lid 104 generally contains a liquid crystal display (LCD) 114 that is used to display the graphical user interface (including perhaps a pointer or cursor) as well as other information to the user. The LCD display 114 is generally surrounded at a peripheral region by a bezel 116 that serves to support the LCD display 114 in its assembled position within the lid 104. The bezel may also serve to reduce electronic emissions emanating from within the lid 102. As should be appreciated, the input devices 106–110 and LCD display 114 are visible to a user of the portable computer 100 when the lid 104 is in the open position and no longer visible to the user when the lid 104 is in a closed position., i.e., the base and lid are substantially flush with one another.

A locking mechanism 120 is also provided for securing the lid 104 to the base 102 when the lid 104 is in the closed position. The locking mechanism 120 generally consists of two parts, a base side locking mechanism 120A and a lid side locking mechanism 120B. As shown, the base side locking mechanism 120A is located in the front portion 102A of the base 102 (in front of the track pad 108) and the lid side locking mechanism 120B is located in a top portion 116A of the bezel 116. Furthermore, the base side locking mechanism 120A and the lid side locking mechanism 120B are cooperatively positioned so that when the lid 104 is closed, the locking mechanisms 120 lockably engage with one another thus securing the lid 104 to the base 102. The locking mechanism 120 also includes a knob or switch 122 for releasing the base side locking mechanism 120A from the lid side locking mechanism 120B (or vice versa) so as to allow the lid 104 to be opened. By way of example, a locking mechanism, which may be used in the portable computer 100, may be found in U.S. patent application Ser. No. 09/755,622, filed on Jan. 5, 2001, which is herein incorporated by reference.

Figure 2:
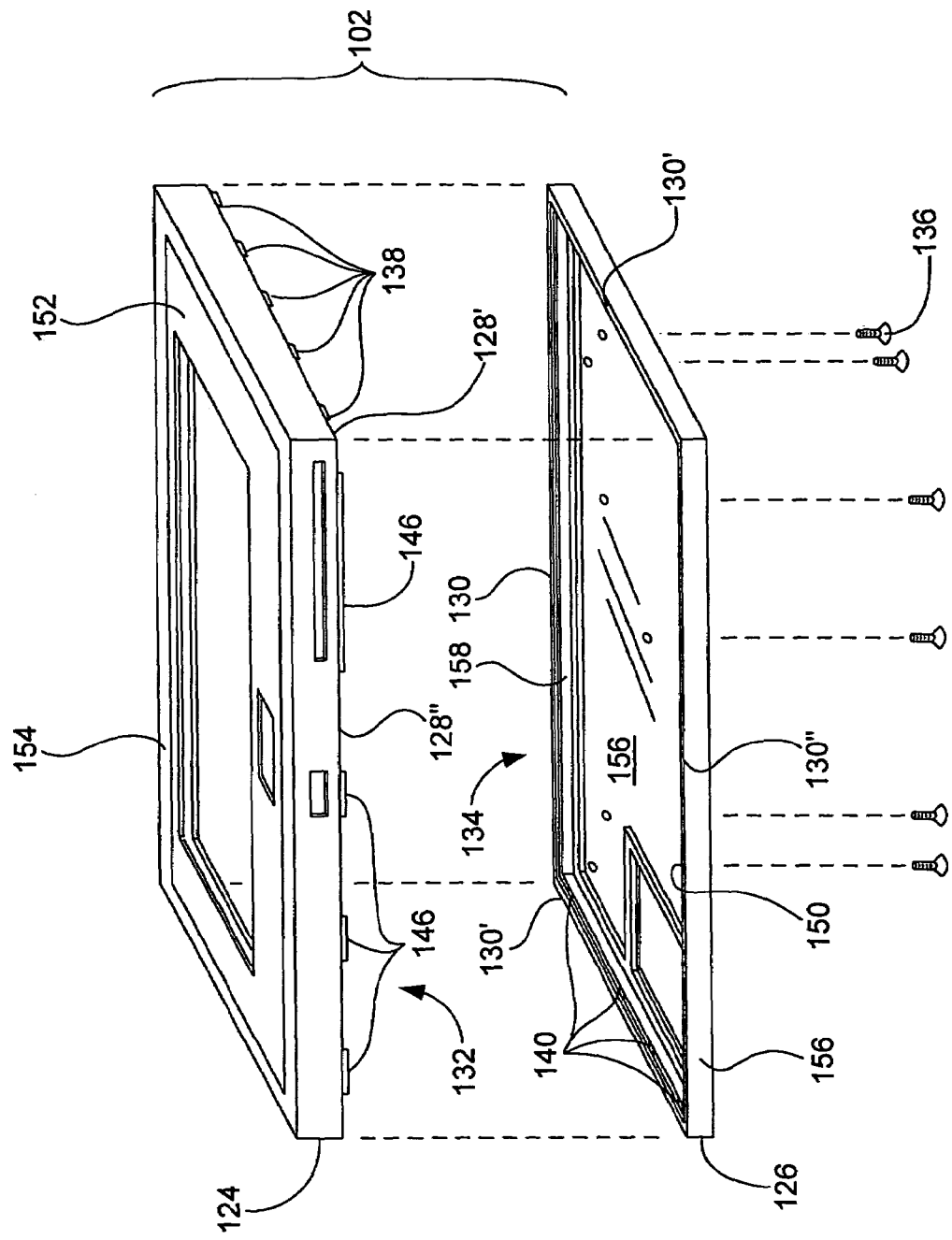
FIG. 2 is a broken away perspective diagram of a base of the portable computer of FIG. 1, in accordance with one embodiment of the present invention.

FIG. 2 is a broken away perspective diagram of the top case 124 and the bottom case 126, in accordance with one embodiment of the present invention. The enclosed components of the base 102 are not shown in FIG. 2 to simplify discussion. The top case 124 and the bottom case 126 are configured to electrically and mechanically couple to one another to form the base 102 so as to enclose the various integrated circuit chips and other circuitry that provide computing operations for the portable computer 100. For example, FIG. 1 shows the base 102 in its assembled condition, i.e., the top and bottom cases 124, 126 are connected, and FIG. 2 shows the base 102 in its unassembled condition, i.e., the top and bottom cases 124, 126 are disconnected. The top and bottom cases 124, 126 are generally adapted for engagement and coupled to one another via a fastening device. In the illustrated embodiment, the peripheral bottom edges 128 of the top case 124 are adapted to engage the peripheral top edges 130 of the bottom case 126, and a plurality of screws 136 are used to hold the two cases 124, 126 together when the peripheral edges 128, 130 are engaged. In addition, the inner surfaces 132, 134 of the top case 124 and bottom case 126 may be formed from a conductive material so as to reduce transmissions of electronic emissions into and out of the base 102. In most cases, the conductive inner surfaces 132, 134 of the top case and bottom cases 124, 126 electrically couple to one another through peripheral edges 128 and 130.

To elaborate further, the peripheral edges 128 of the top case 124 generally include angled retention hooks 138, and the peripheral edges 130 of the bottom case 126 generally include angled retention slots 140. The angle of the hooks and slots generally correspond with one another. As shown, the retention hooks 138 are positioned along opposing side peripheral edges 128' of the top case 124, and the retention slots 140 are positioned along opposing side edges 130' of the bottom case 126. The angled retention hooks 138 are typically angled towards the front of the top case 124 while the angled retention slots are typically angled towards the rear of the bottom case 126. As such, the angled retention hooks 138 are configured to slide into the angled retention slots 140 thus securing the peripheral edges 128' and 130' together, i.e., the hooks and slots are inversely similar. As should be appreciated, the angled feature of the hooks and slots provides greater strength, i.e., in two coordinates, than a non-angled feature. However, it should be noted, that this is not a limitation and that the design of the hooks and slots may vary according to the specific design of each case.

The top case 124 also includes a plurality of recessed lips 146 that are positioned along a front peripheral edge 128" of the top case 124. The plurality of recessed lips 146 are configured to engage a front portion 150 of the bottom case 126 when the retention hooks 138 are slid into the retention slots 140 of the bottom case 126 so as to secure the front edges 128" and 130" of the top and bottom cases 124, 126 together. As should be appreciated, the hooks, slots and lips work together to hold the two cases in place while the screws (when engaged) are arranged to hold the cases together and to prevent the hooks and lips from sliding out.

Additionally, the top case 124 generally includes a top plate 152 with a top frame 154 attached thereto, and the bottom case 126 generally includes a bottom plate 156 with a bottom chassis 158 attached thereto. The top frame 154 and the bottom chassis 158 are arranged to structurally support the periphery of the top and bottom plates 152, 156, respectively. In one embodiment, an adhesive is used to structurally attach the top frame 154 to the top plate 152 and to structurally attach the bottom chassis 158 to the bottom plate 156. In another embodiment, a conductive paste is used to electrically bond the top frame 154 to the top plate 152 and to electrically bond the bottom chassis 158 to the bottom plate 156. These two embodiments will be described in greater detail below. As shown, the top plate 152, top frame 154 and bottom plate 156, provide a shell for enclosing the internal components. For example, the top frame 154 and bottom plate 156 provide walls for surrounding the internal components, and the top plate 152 and bottom plate 156 provide surfaces for covering the internal components.

Although not shown in FIG. 2, the base 102 may enclose an inner frame for helping support the inner regions of the base 102. The inner frame generally includes a plurality of ribs that are attached to the top frame 154 and/or the bottom chassis 158 and that extend in multiple directions therefrom. The internal components such as the microprocessor, Read-Only Memory (ROM), Random-Access Memory (RAM), disk drives, battery, and various input/output support devices are typically placed within open areas formed between the plurality of ribs.

Figure 3:
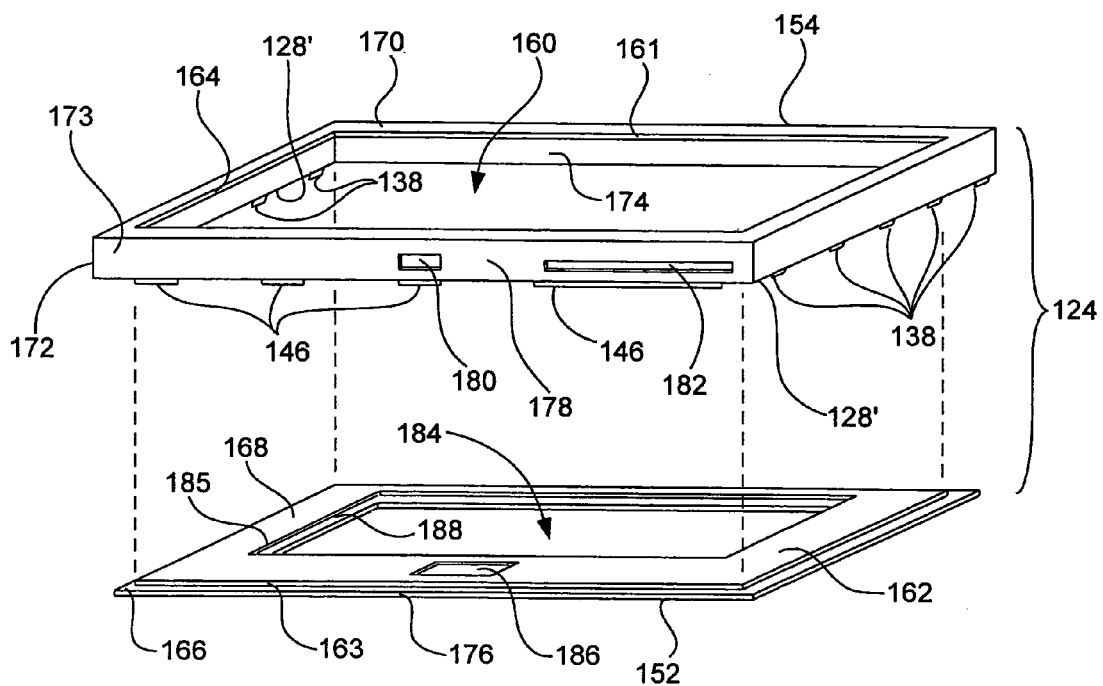
FIG. 3 is a broken away perspective diagram of a top casing of the base of FIG. 2, in accordance with one embodiment of the present invention.

FIG. 3 is a broken away perspective diagram of the top plate 152 and the top frame 154, in accordance with one embodiment of the present invention. As shown, the top plate 152 is configured for placement within the top frame 154. The top frame 154 includes a plate opening 160 for receiving a raised portion 162 of the top plate 152, and a flange portion 164 for receiving a first recessed portion 166 of the top plate 152. For example, the shape of the plate opening 160 typically coincides with the shape of the raised portion 162. In one embodiment, the opening 160 has an inner peripheral surface 161 that is configured to substantially mate with an outer peripheral surface 163 of the raised portion 162 when the raised portion 162 is placed within the opening 160. In another embodiment, a top surface 168 of the top plate 152 is configured to be flush with a top surface 170 of the top frame 154 when the raised portion 162 of the top plate 152 is placed within the plate opening 160 of the top frame 154 (as shown in FIGS. 1 & 2).

The top frame 154 also includes a wall portion 172 that extends below the flange portion 164. As shown, the outer periphery 173 of the wall portion 172 makes up a portion of the exterior of the base 102 while the inner periphery 174 of the wall portion 172 is configured to surround the outer periphery 176 of the recessed portion 166 when the top plate 152 is placed within the top frame 154. In the illustrated embodiment, the retention hooks 138 and lips 146 extend from the peripheral bottom edge 128 of the wall portion 172.

Further, the wall portion 172 includes various openings for providing access to components of the portable computer 100. For example, a front side 178 of the top frame 130 includes a switch opening 180 for allowing access to the switch 122, and a drive opening 182 for allowing access to a disk drive such as a floppy, zip, CD or DVD drive. Further still, the raised portion 162 includes a keyboard opening 184 and a track pad opening 186. The keyboard opening 184 is adapted for receiving the keyboard 106, and the track pad opening 186 is adapted for receiving the track pad 108 and button(s) 110. The top plate 152 also includes a second recess portion 188 for supporting a bottom edge of the keyboard 106 when the keyboard 106 is placed within the opening 184. As shown, the second recess portion 188 extends into the opening 184 past the inner periphery 185 of the opening 184. In most situations, the keyboard opening 184 is arranged to allow access to various internal components of the portable computer 100 when the keyboard 106 is moved away from the opening 184. By way of example, the opening 184 may allow an operator of the portable computer 100 to upgrade internal components such as a modem, memory, hard drive and/or the like.

Figure 5:
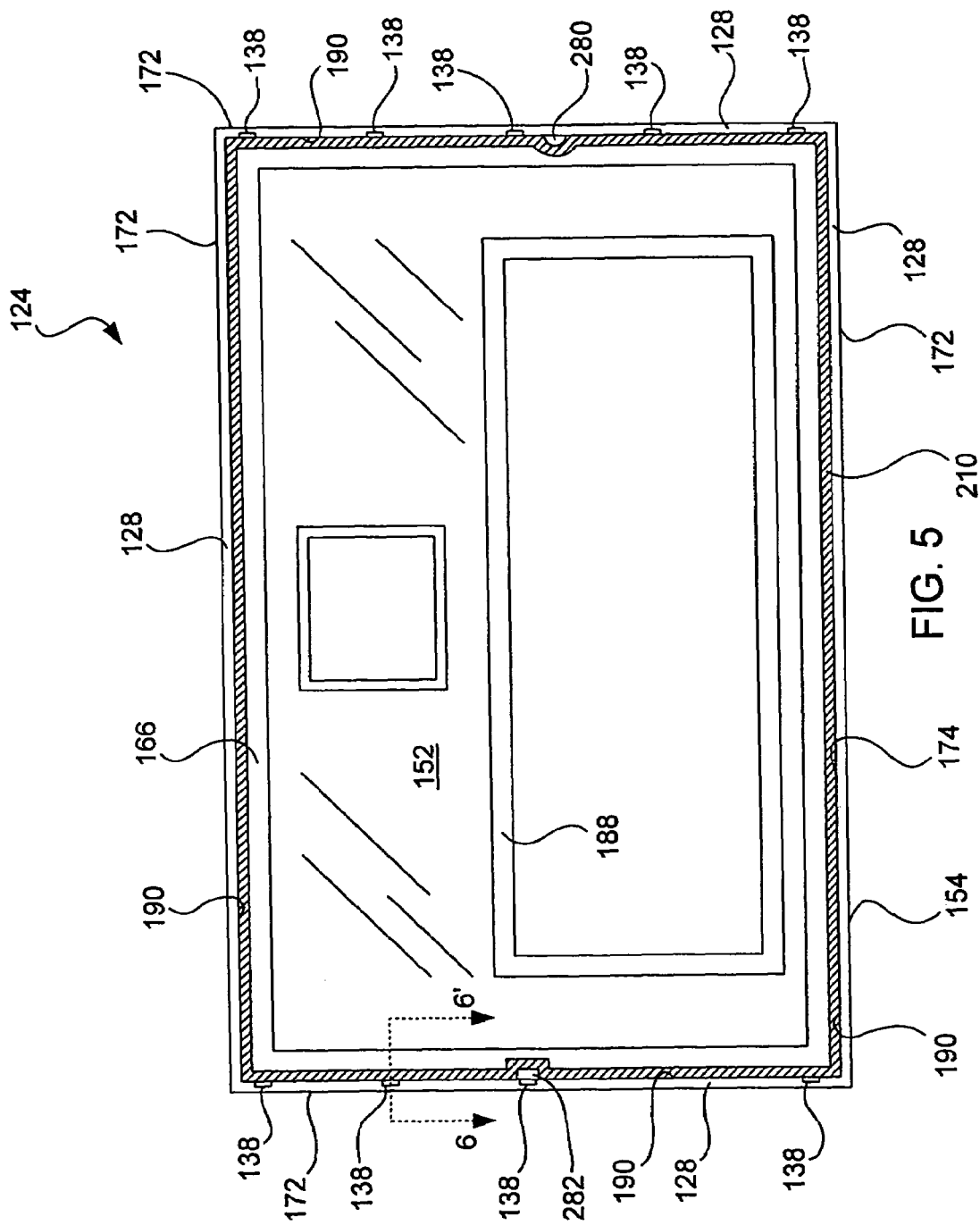
FIG. 5 is a top inside view of the top casing of FIG. 3, in accordance with one embodiment of the present invention.

Referring to FIGS. 5 & 6, the top case 124 will be described in greater detail. FIG. 5 is a top inside view of the top case 124, in accordance with one embodiment of the present invention, and FIG. 6 is a side elevation view, in cross section of the top case 124 including the top plate 152 and the top frame 154, in accordance with one embodiment of the present invention. In the illustrated embodiments, the top plate 152 is formed from a suitable shielding material such as sheet metal. By way of example, 0.4 mm thick Titanium sheet metal may be used. Titanium sheet metal provides great shielding while increasing rigidity and reducing the weight of the portable computer 100 (e.g., Titanium is stronger than steel, but lighter than Aluminum).

In addition, the top frame 154 is formed from a suitable plastic, and the inner surfaces are selectively coated with a conductive layer 190. The conductive layer 190 is typically arranged to provide shielding for electronic emissions. By way of example, the top frame 154 may be formed from a carbon fiber and the inner surfaces of the top frame 154 may be selectively plated with a Nickel or Nickel-Copper material having a thickness of approximately 1 micrometer. In most cases, the conductive layer 190 is disposed around the inner periphery 174 of the wall 172 and a segment 192 of the flange portion 164 (as shown in FIG. 6). It should be noted, however, that this is not a limitation and that the coverage of the conductive layer may vary according to the specific needs of each enclosure. Furthermore, as shown, the conductive layer 190 may be disposed over the peripheral edges 128 and over the angled retention hooks 138 extending from the peripheral bottom edges 128 of the wall 172.

It should be noted that the above elements are not a limitation and that they may vary according to the specific needs of each enclosure. For example, steel sheet metal may be used to form the top plate, and the top frame may be formed from other materials including plated plastic or metal. Moreover, the conductive layer may be applied by coating, painting, depositing and/or the like. Additionally, the conductive layer may be formed from other suitable materials or coatings such as silver or copper paint. As should be appreciated, the thickness of the conductive layer may vary (larger or smaller) according to the type of material used and the method for applying the material.

In accordance with one aspect of the invention, a structural adhesive 200 is used to structurally attach the top frame 154 to the top plate 152 (as shown in FIG. 6). The structural adhesive 200 is configured to exhibit good strength characteristics and good adhesion between the top frame 154 and the top plate 152. The structural adhesive 200 is also configured to reduce tolerance variability in the overall geometry of the top case 124. The adhesive generally has both a compliant state and a binding state. The binding nature of the adhesive 200 is arranged to form a singular composite structure between two disparate parts (e.g., metal top plate and plastic top frame) that is stronger than conventional fastening methods, i.e., bolts, screws, snaps, and inserts. The compliant nature of the adhesive 200 is arranged to absorb geometric variations of the two disparate parts (e.g., metal top plate and plastic top frame) so as to form a singular composite structure with an overall geometry that is desirable.

As shown in FIG. 6, the structural adhesive 200 is disposed between the flange portion 164 of the top frame 154 and the recessed portion 166 of the top plate 152. More particularly, the structural adhesive 200 is disposed between an exposed segment 202 of the flange portion 164, and an exposed segment 204 of the recessed portion 166. By exposed, it is meant that the surface is a non-coated surface. For example, the exposed segment 202 generally corresponds to the plastic surface rather than the conductive layer 190. As should be appreciated, this is done to ensure a good bond between the adhesive 200 and the top frame 154. For instance, the bond between the adhesive and the plastic is typically greater than the bond between the conductive layer and the plastic.

In most cases, the flanged portion 164 and the recessed portion 166 are arranged to form a gap G therebetween for the placement of the adhesive 200. The gap G is generally disposed between the exposed segment 202 and the exposed segment 204. In the illustrated embodiment, the size of the gap G is defined by a length L of the recessed portion 166 (from the top surface 168 to the surface 204) and a thickness T of the flanged portion 164 when the top surface 168 of the top plate 152 is flush with the top surface 170 of the top frame 154. In most cases, flush surfaces are desired to produce a substantially planar surface along the outer peripheral surface of the top case 124. This is considered to be a geometric tolerance of the top case 124.

As should be appreciated, the geometric tolerances of the top case 124 must be predictable to meet production yield standards. The top frame 154 and top plate 152 are typically manufactured using very different processes (e.g., molded plastic and formed sheet metal) representing very different tolerances. Unfortunately, the tolerances of the top frame 154 and the top plate 152 may stack thus forming a final assembly (e.g., top case 124) that doesn't meet standards. By way of example, tolerance stacking may lead to an overall thickness that is too large or too small or to adjacent surfaces that do not align properly with one another, i.e., parts that don't fit together or parts that create undesirable surfaces such as lips. Referring to FIG. 6, if the length L is too large and/or if the thickness T is too small then a non-flush surface between the top surface 168 of the top plate 152 and the top surface 170 of the top frame 154 may be encountered, i.e., a lip may be formed.

Accordingly, the adhesive 200 is arranged to absorb geometric variations that may influence a parts position relative to another parts position. That is, the structural adhesive 200 is configured to be compliant so as to conform to the width of the gap G even when the tolerances of the parts are at a maximum or minimum. By way of example, variations in the parts may lead to a gap size of between 0.2 and 0.6 mm. In the illustrated embodiment, the width of the compliant adhesive 200 is configured to adjust with the width of the gap G to place the top surface 168 of the top plate 152 flush with the top surface 170 of the top frame 154. For example, the compliant adhesive 200 is arranged to conform to a larger gap G when the length L is at a maximum tolerance and/or when the thickness T is at a minimum tolerance. In addition, the compliant adhesive 200 is arranged to conform to a smaller gap G when the length L is at a minimum tolerance and/or when the thickness T is at a maximum tolerance. In this way there is no tolerance stacking. That is, slight geometry variations in one part will have no influence on an adjacent parts position in the assembly.

In one embodiment, the compliant structural adhesive 200 is a glue that is compliant when dispensed and then cures to a rigid structure over time. In particular, the glue transforms between a liquid state, exhibiting its compliant attributes, and a solid state, exhibiting its structural attributes. In the liquid state, the glue exhibits a readiness to flow and a relatively high incompressibility that allows it to fill the gap (whether small or large). In the solid state, the glue exhibits rigidity and a relatively high resistance to movement that allows it to maintain the width of gap chosen during the liquid state, and to form a singular composite structure. By way of example, the glue may be applied between the top frame 154 and the top plate 152 in bead form (liquid state), and after a set time, the glue may harden thus forming a rigid structure that attaches the top frame 154 to the top plate 152 (solid state). Generally speaking, the adhesive offers a dynamic way to place multiple parts in desired positions relative to one another and a static way to fix the multiple parts together. In one implementation, the glue is a two-part catalytic epoxy that forms a strong structural bond between the plastic top frame and the metal top plate. By way of example, 201/19 epoxy produced by Lord Co. of Erie, Pa., may be used to structurally attach the carbon fiber top frame to the titanium top plate.

In accordance with another aspect of the invention, a conductive bridge 210 is used to electrically connect the top frame 154 to the top plate 152. In the illustrated embodiment, the conductive bridge 210 is electrically bonded to a portion of the conductive layer 190 and to a portion of the top plate 152. The binding nature of the conductive bridge 210 is arranged to form a singular electrical structure, including the conductive layer 190 and the top plate 152, for shielding the top case 124 from electronic emissions. In most cases, the conductive bridge 210 is arranged to seal a gap 212 formed between the recessed portion 166 of the top plate 152 and the conductive layer 190 of the top frame 154, i.e., the conductive bridge 210 is disposed in the gap 212. As should be appreciated, without the conductive bridge 210, the gap 212 typically provides an electrical opening where radiation and/or electronic emissions may escape. In general, the conductive bridge 210 provides a better electrical flow therethrough than could be obtained through the top plate 152 and conductive surface 190 directly.

The conductive bridge 210 is generally formed from a suitable conductive material. In a preferred embodiment, the conductive bridge is formed from a conductive paste that exhibits good electrical characteristics and good adhesion between the conductive layer 190 and the top plate 152. The conductive paste generally has two states—a liquid state and a solid state. In most cases, the conductive paste is applied in its liquid state (between the top plate and the top frame) and after a set time it changes to its solid state, i.e., the conductive paste is rigidly set over time, thus forming the electrically integrated structure. For example, the conductive bridge 210 may be formed by dispensing a conductive paste in bead form over the edge of the recessed portion 166 of the top plate 152 and allowing the bead to flow over the side of the recessed portion and over the segmented portion 192 of the conductive layer 190 of the top frame 154 via gravity.

In one embodiment, the conductive paste is a metal filled electrically conductive ink that forms a strong electrical bond between the plated top frame and the metal top plate. In general, the electrically conductive ink is a solvent-based material that includes a metal filler and a carrier medium for carrying the metal filler. In most cases, the carrier medium is acetate. During several experiments, it was found that a nickel filled electrically conductive ink formed an exceptionally strong electrically bond between the Nickel-Copper plated conductive layer 190 and the titanium top plate 152. It is generally believed that the strong electrical bond is created because of the ability of the nickel to overcome oxidation problems that may be found on the surface of the titanium top plate, i.e., the nickel base conductive ink eats through the oxidation. It was also found that a nickel filled electrically conductive ink having a viscosity of between about 5,000 centipoise to about 10,000 centipoise, and more particularly about 7,500 centipoise works well. Furthermore, Nickel filled electrically conductive ink provides a good balance of low cost and high conductivity. In one embodiment, a nickel filled electrically conductive ink (part no. EE 40-3917) produced by Epoxies, Etc. of Cranston, R.I., may be used. In some implementations, it may desirable to modify the conductive ink (EE 40-3917), which has a viscosity of 14,000 centipoise, to maintain the viscosity mentioned above. For example, an acetate solution may be added to EE 40-3917 to produce a viscosity of between about 5,000 centipoise to about 10,000 centipoise, and more particularly about 7,500 centipoise.

Figure 4:
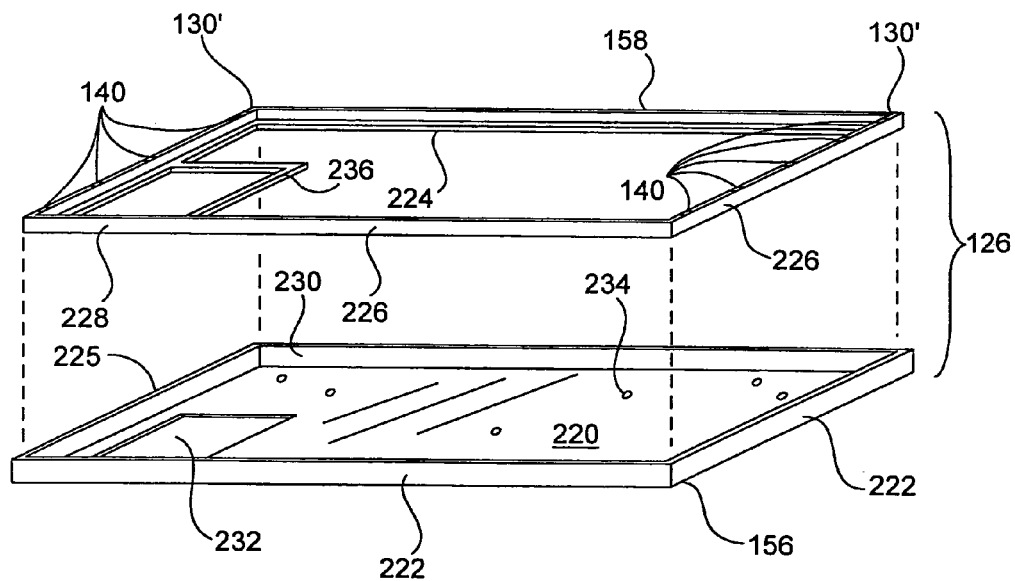
FIG. 4 is a broken away perspective diagram of a bottom casing of the base of FIG. 2, in accordance with one embodiment of the present invention.

FIG. 4 is a broken away perspective diagram of the bottom plate 156 and the bottom chassis 158, in accordance with one embodiment of the present invention. As shown, the bottom chassis 158 is configured for placement within the bottom plate 156. The bottom plate 156 includes a bottom surface 220 and a bottom plate wall 222 extending upwards therefrom. The bottom surface 220 is arranged for receiving a flange portion 224 of the bottom chassis 158, and the bottom plate wall 222 is arranged for receiving a bottom chassis wall 226 extending upwards from the flange portion 224. The outer periphery 228 of the bottom chassis wall 226 is arranged to substantially coincide with the inner periphery 230 of the bottom plate wall 222. In the illustrated embodiment, the retention slots 140 are positioned on the peripheral top edge 130 of the bottom chassis wall 226. Furthermore, a top surface 225 of the bottom plate wall 222 is configured to extend above the peripheral edge 130 of the bottom chassis wall 226 when the bottom chassis 158 is attached to the bottom plate 156. This extended distance is generally referred to as the predetermined offset position O. The predetermined offset position O will be described in greater detail below.

Further, both the bottom plate wall 222 and the bottom chassis wall 226 are arranged to cooperate with the wall portion 172 of the top frame 154 so as to form a box like structure (e.g., base) when the top case 124 and bottom case 126 are fastened together. For example, the top surface (e.g., peripheral edge 130) of the bottom chassis wall 226 is configured to engage the peripheral edge 128 of the top frame wall 172, and the bottom plate wall 222 is configured to surround the outer periphery 173 of the top frame wall 172. In most cases, the top frame 154 includes a recessed edge for receiving the extended portion of the bottom plate wall 222 so that the outer peripheral surface of the top frame wall 172 is flush with the outer peripheral surface of the bottom plate wall 222 when connected.

Further still, the bottom plate 156 includes various openings for providing access to various components of the portable computer 100. For example, the bottom surface 220 of the bottom plate 156 includes a battery opening 232 for allowing access to a battery (not shown) housed within the base 102, and a plurality of through holes 234 for allowing the passage of screws 136. Further still, the bottom chassis 158 includes various extensions for providing support to the bottom plate 156. For example, the bottom chassis 158 includes a rib 236, which generally extends from the flange portion 224, for surrounding the battery opening 232.

Figure 7:
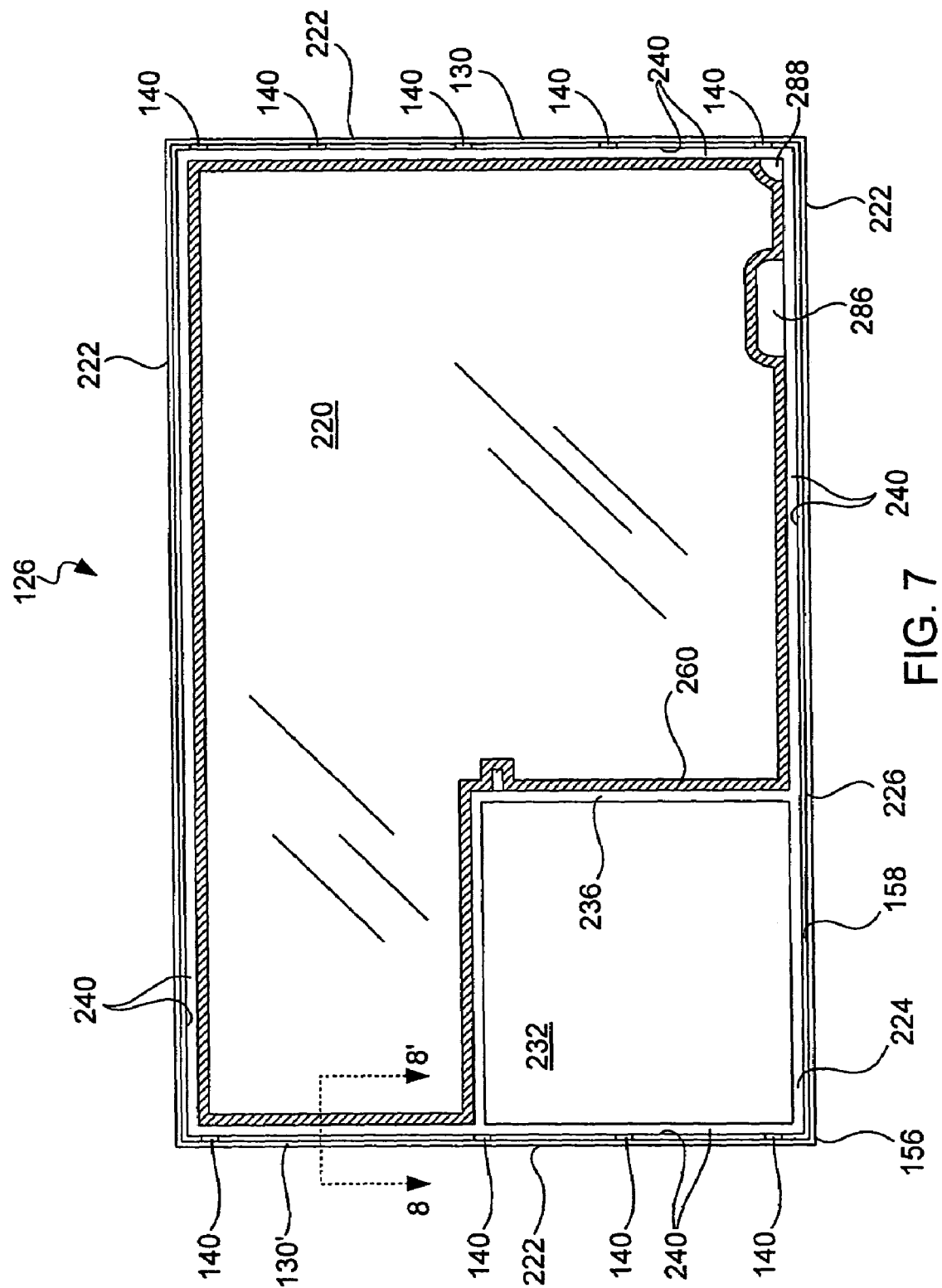
FIG. 7 is a top inside view of the bottom casing of FIG. 4, in accordance with one embodiment of the present invention.

Referring to FIGS. 7 & 8, the bottom case 126 will be described in greater detail. FIG. 7 is a top inside view of the bottom case 126, in accordance with one embodiment of the present invention, and FIG. 8 is a side elevation view, in cross section of the bottom case 126 including the bottom plate 156 and the bottom chassis 158, in accordance with one embodiment of the present invention. In the illustrated embodiments, the bottom plate 156 is formed from a suitable shielding material such as sheet metal. By way of example, 0.4 mm thick Titanium sheet metal may be used. Titanium sheet metal provides great shielding while increasing rigidity and reducing the weight of the portable computer 100 (e.g., Titanium is stronger than steel, but lighter than Aluminum).

In addition, the bottom chassis 158 is formed from a suitable plastic, and the inner surfaces are selectively coated with a conductive layer 240. The conductive layer 240 is typically arranged to provide shielding for electronic emissions. By way of example, the bottom chassis 158 may be formed from a carbon fiber and the inner surfaces of the bottom chassis 158 may be selectively plated with a Nickel or Nickel-Copper material having a thickness of approximately 1 micrometer. In most cases, the conductive layer 240 is disposed around the inner periphery of the bottom chassis wall 226 and the flange portion 224 (as shown in FIG. 8). It should be noted, however, that this is not a limitation and that the coverage of the conductive layer may vary according to the specific needs of each enclosure. Furthermore, as shown, the conductive layer 240 may be disposed over the peripheral edges 130 and over the angled retention slots 140 disposed in the peripheral top edges 130' of the bottom chassis wall 226, and over the edge 242 of the flange portion 224.

It should be noted that the above elements are not a limitation and that they may vary according to the specific needs of each enclosure. For example, steel sheet metal may be used to form the bottom plate, and the bottom chassis may be formed from other conductively plated plastic materials. Moreover, the conductive layer may be applied by coating, painting, depositing and/or the like. In addition, the conductive layer may be formed from other suitable materials or coatings such as silver or copper paint. As should be appreciated, the thickness of the conductive layer may vary (larger or smaller) according to the type of material used and the method for applying the material.

In a manner analogous to forming the top case 124, a structural adhesive 250 is also used to structurally attach the bottom chassis 158 to the bottom plate 156 (as shown in FIG. 8). The structural adhesive 250 is configured to exhibit good strength characteristics and good adhesion between the bottom plate 156 and the bottom chassis 158. The structural adhesive 250 is also configured to reduce tolerance variability in the overall geometry of the bottom case 126. The adhesive generally has both a compliant state and a binding state. The binding nature of the adhesive 250 is arranged to form a singular composite structure between the two disparate parts (e.g., metal bottom plate and plastic bottom chassis) that is stronger than conventional fastening methods, i.e., bolts, screws, snaps, and inserts. The compliant nature of the adhesive 250 is arranged to absorb geometric variations of two disparate parts (e.g., metal bottom plate and plastic bottom chassis) so as to form a singular composite structure with an overall geometry that is desirable.

As shown in FIG. 8, the structural adhesive 250 is disposed between the flange portion 224 of the bottom chassis 158 and the bottom surface 220 of the bottom plate 156. More particularly, the structural adhesive 250 is disposed between an exposed segment 223 of the bottom chassis 158, and an exposed segment 221 of the bottom plate 156. By exposed, it is meant that the surface is a non-coated surface. Alternately or additionally, the structural adhesive 250 may be disposed between the bottom chassis wall 226 of the bottom chassis 158 and the bottom plate wall 222 of the bottom plate 156.

In most cases, the bottom surface 220 and the flanged portion 224 are arranged to form a gap G' therebetween for the placement of the adhesive 250. The gap G' is generally disposed between the exposed segment 221 and the exposed segment 223. In the illustrated embodiment, the size of the gap G' is defined by a length L1 of the bottom plate wall 222 and the length L2 of the bottom chassis wall 226 when the top 130 of the bottom chassis wall 226 and the top 227 of the bottom plate wall 222 are placed at the predetermined offset position O. In most cases, the tolerances of the offset O are tightly controlled to ensure properly interfacing parts.

As should be appreciated, the geometric tolerances of the bottom case 124 must be predictable to meet production yield standards. The bottom chassis 158 and bottom plate 156 are typically manufactured using very different processes (e.g., molded plastic and formed sheet metal) representing very different tolerances. Unfortunately, the tolerances of the bottom chassis 158 and the bottom plate 156 may stack thus forming a final assembly (e.g., bottom case 126) that doesn't meet standards. By way of example, tolerance stacking may lead to a bottom case that does not align properly with a top case, i.e., parts that don't fit together or parts that create undesirable surfaces such as gaps. Referring to FIG. 8, if the length L1 is too large and/or if the length L2 is too small then a large offset O may be encountered that causes problems when interfacing the top case 124 with the bottom case 126, i.e., the hooks 138 may not interface with the slots 140.

Accordingly, the adhesive 250 is arranged to absorb geometric variations that may influence a parts position relative to another parts position. That is, the structural adhesive 250 is configured to be compliant so as to conform to the width of the gap G' even when the tolerances of the parts are at a maximum or minimum. By way of example, variations in the parts may lead to a gap size of between 0.2 and 0.6 mm. In the illustrated embodiment, the width of the compliant adhesive 250 is configured to adjust with the width of the gap G' to ensure the predetermined offset O. For example, the compliant adhesive 250 is arranged to conform to a larger gap G' when the length L1 is at a maximum tolerance and/or when the length L2 is at a minimum tolerance. In addition, the compliant adhesive 250 is arranged to conform to a smaller gap G' when the length L1 is at a minimum tolerance and/or when the length L2 is at a maximum tolerance. In this way there is no tolerance stacking. That is, slight geometry variations in one part will have no influence on an adjacent parts position in the assembly.

In one embodiment, the compliant structural adhesive 250 is a glue that is compliant when dispensed and then cures to a rigid structure over time. In particular, the glue transforms between a liquid state, exhibiting its compliant attributes, and a solid state, exhibiting its structural attributes. In the liquid state, the glue exhibits a readiness to flow and a relatively high incompressibility that allows it to fill the gap (whether small or large). In the solid state, the glue exhibits rigidity and a relatively high resistance to movement that allows it to maintain the width of gap chosen during the liquid state, and to form a singular composite structure. By way of example, the glue may be applied between the bottom plate 156 and the bottom chassis 158 in bead form (liquid state), and after a set time, the glue may harden thus forming a rigid structure that attaches the bottom plate 156 and the bottom chassis 158 (solid state). Generally speaking, the adhesive offers a dynamic way to place multiple parts in desired positions relative to one another and a static way to fix the multiple parts together. In one implementation, the glue is a two-part catalytic epoxy that forms a strong structural bond between the plastic bottom chassis and the metal bottom plate. By way of example, 201/19 epoxy produced by Lord Co. of Erie, Pa., may be used to structurally attach the carbon fiber bottom chassis to the titanium bottom plate.

In a manner analogous to forming the top case, a conductive bridge 260 is also used to electrically connect the bottom chassis 158 to the bottom plate 156 when forming the bottom case 126. In the illustrated embodiment, the conductive bridge 260 is electrically bonded to a portion of the conductive layer 240 and to a portion of the bottom plate 156. The binding nature of the conductive bridge 260 is arranged to form a singular electrical structure, including the conductive layer 240 and the bottom plate 156, for shielding the bottom case 126 from electronic emissions. In most cases, the conductive bridge 260 is arranged to seal a gap 262 formed between the bottom surface 220 of the bottom plate 156 and the conductive layer 240 of the bottom chassis 158, i.e., the conductive bridge 260 is disposed in the gap 262. As should be appreciated, the gap 262 typically provides an electrical opening where radiation and/or electronic emissions may escape. In general, the conductive bridge 260 provides a better electrical flow therethrough than could be obtained through the bottom plate 156 and conductive surface 240 directly.

The conductive bridge 260 of the bottom case 126 is generally formed from a suitable conductive material. In a preferred embodiment, the conductive bridge is formed from a conductive paste that exhibits good electrical characteristics and good adhesion between the conductive layer 240 and the bottom plate 156. The conductive paste generally has two states—a liquid state and a solid state. In most cases, the conductive paste is applied in its liquid state (between the bottom plate and the bottom chassis) and after a set time it changes to its solid state, i.e., the conductive paste is rigidly set over time, thus forming the electrically integrated structure. For example, the conductive bridge 260 may be formed by dispensing a conductive paste in bead form over a bottom surface 229 of the flange portion 224 of the bottom chassis 158 and allowing the bead to flow over the edge 242 of the flange portion 224 and over the bottom surface 220 of the bottom plate 156 via gravity.

In one embodiment, the conductive paste is a metal filled electrically conductive ink that forms a strong electrically bond between the plated top frame and the metal top plate. During several experiments, it was found that a nickel filled electrically conductive ink formed an exceptionally strong electrically bond between the Nickel-Copper plated conductive layer 240 and the titanium bottom plate 156. It is generally believed that the strong electrical bond is created because of the ability of the nickel to overcome oxidation problems that may be found on the surface of the titanium top plate, i.e., the nickel base conductive ink eats through the oxidation. It was also found that a nickel filled electrically conductive ink having a viscosity of between about 5,000 centipoise to about 10,000 centipoise, and more particularly about 7,500 centipoise works well. Furthermore, Nickel filled electrically conductive ink provides a good balance of low cost and high conductivity. In one embodiment, a nickel filled electrically conductive ink (part no. EE 40-3917) produced by Epoxies, Etc. of Cranston, R.I., may be used. In some implementations, it may be desirable to modify the conductive ink (EE 40-3917), which has a viscosity of 14,000 centipoise, to maintain the viscosity mentioned above. For example, an acetate solution may be added to EE 40-3917 to produce a viscosity of between about 5,000 centipoise to about 10,000 centipoise, and more particularly about 7,500 centipoise.

FIG. 9 is a flow diagram illustrating a method 300 of constructing an enclosure with a frame and a casing, in accordance with one embodiment of the present invention. By way of example, the frame may be the top frame 154 (FIGS. 3, 5–6) or the bottom chassis 158 (FIGS. 4, 7–8), and the casing may be the top plate 152 (FIGS. 3, 5–6) or the bottom plate 156 (FIGS. 4, 7–8). The method 400 generally begins at step 402 where the frame and casing are prepared for assembly. In the case where either the frame or casing is formed from a non-conductive material, step 402 includes selectively coating the part with a conductive material. By selectively coating, it is meant that only desired portions of the part are coated, as for example, the interior surfaces of the frame or casing. As should be appreciated, the conductive material is arranged for shielding electronic emissions. By way of example, plating is one suitable implementation for conductively coating the interior surfaces of a non-conductive part. During plating, the non conductive part is dunked into several plating baths containing various solutions until a conductive layer adheres to the selected surfaces. Plating is generally well known in the art and for the sake of brevity will not be described in greater detail. Furthermore, while plating works well for forming a conductive layer, it should be noted that it is not a limitation and that other methods may be used. For example, the conductive layer may be painted on with conductive paint, or deposited on using known deposition techniques.

In one embodiment, the frame is formed from a first material, and the casing is formed from a second material that is different than the first material. For example, the frame may be formed from a non-conductive material such as plastic and the casing may be formed from a conductive material such as sheet metal. As such, the frame is typically coated with a conductive layer. With reference to the earlier described embodiments, the top frame 154 and the bottom chassis 158 are generally formed from a plastic material such as carbon fiber plastic, and therefore they are typically lined with a conductive layer, as for example, conductive layers 190 and 240.

Although the invention has been described using a non-conductive frame and a conductive casing, it should be noted that this is not a limitation. For example, in some cases, it may be desirable to make an enclosure with a conductive frame and a non-conductive casing, and in other cases it may be desirable to make an enclosure with a non-conductive frame and a non-conductive casing. In the last example, both the frame and the casing may have a conductive layer applied thereto. In yet other cases, it may be desirable to make an enclosure with a conductive frame and a conductive casing.

After preparing the frame and casing, the process flow proceeds to step 404 where the frame is structurally bonded to the casing (or vice versa). This is typically done to form a singular integrated part, i.e., the frame serves to support and provide rigidity to the casing. In one embodiment, the frame is glued to the casing. In the case where the frame and casing are formed from different materials, the glue is arranged to have good adhesion qualities to both the frame and the casing. The binding nature of the glue is arranged to form a singular composite structure between the two disparate parts (e.g., metal bottom plate and plastic bottom chassis) that is stronger than conventional fastening methods, i.e., bolts, screws, snaps, and inserts. For instance, fasteners are typically located at discrete points at the interface of two parts, and glue is applied over a large surface area at the interface of two parts. In some cases, the glue is applied in bead form on a predetermined surface of the frame, in other cases the glue is applied in bead form on a predetermined surface of the casing. In either case, the frame and casing are brought together at the glue interface to bind the two disparate parts together. After a set time, the glue adheres to the adjacent surfaces of the two parts and hardens thus forming an integrated structure. In addition to providing a stronger structure, the glue also provides dimensional stability that is not found using conventional methods. That is, the glue in its liquid state can fill gaps found at the interface of the two parts and thus closely held tolerances can be maintained.

After structurally bonding the frame to the casing, the process flow proceeds to step 406 where the frame is electrically bonded to the casing (or vice versa). This is typically done to form a singular integrated part that can shield electronic devices that are contained therein. As should be appreciated, in the process of gluing the frame to the casing, a gap is typically formed therebetween that may provide an opening for the transmission of the electronic emissions. In one embodiment, the gap is filled using a conductive paste. In the case where the conductive portions of the frame and casing are formed from different materials, the paste is arranged to have good adhesion qualities to both the conductive portions of the frame and the conductive portions of the casing. The binding nature of the paste is arranged to form a singular electrical shield between the two disparate parts (e.g., metal top plate and plated top frame).

Figure 11A:
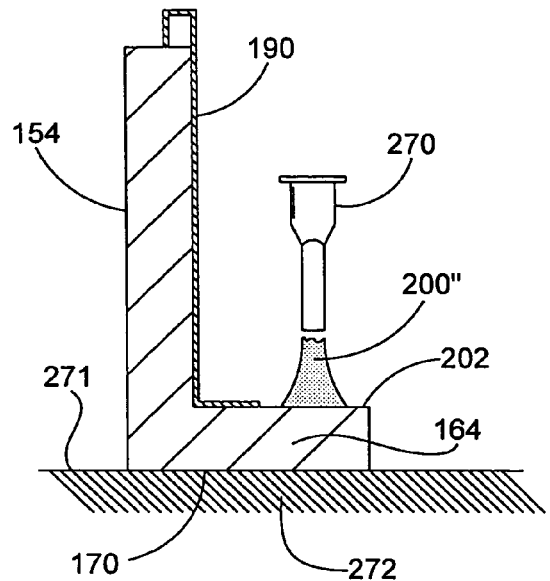
FIGS. 11A–C are side views, in cross section, showing one method of structurally coupling a frame to a casing, in accordance with one embodiment of the present invention.
Figure 11B:
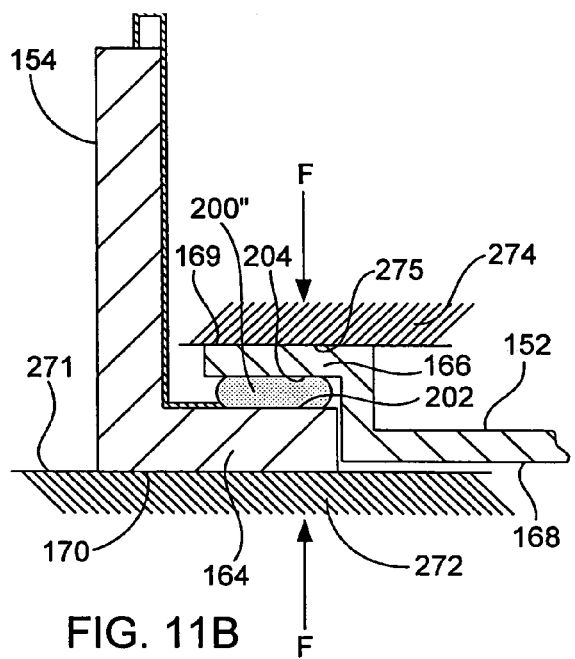
Figure 11C:
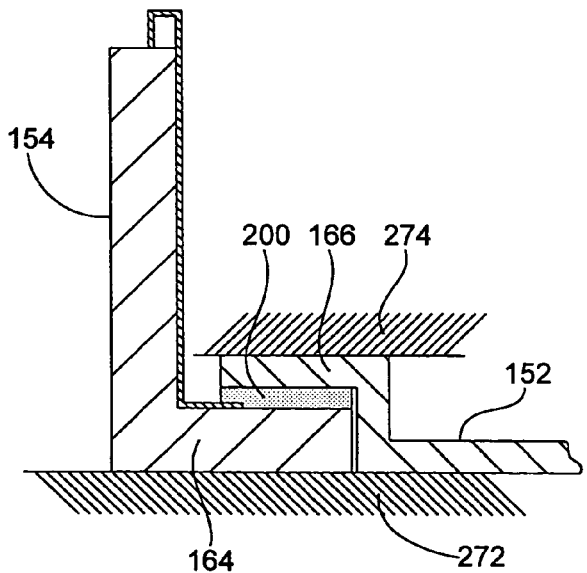

Referring to FIGS. 10 and 11A–C a method 304 for structurally bonding the frame to the casing will be disclosed. FIG. 10 is a flow diagram, and FIGS. 11A–C are side elevation views of the frame and casing, illustrating the steps of the method, in accordance with one embodiment of the present invention. For ease of discussion, FIG. 11 corresponds to the embodiments shown in FIGS. 3, and 5–6. Thus, FIG. 11 is a side elevation view, in cross section, of the top case 124 including the top plate 152 (e.g., casing) and the top frame 154 (e.g., frame). However, it should be noted, that the following method can also be applied to the embodiments shown in FIGS. 4, and 7–8 (e.g., bottom case 126) as well. The method 404 generally begins at step 500 where a glue is dispensed onto the frame or casing. The glue is generally arranged for structurally bonding the frame to the casing. That is, the glue has properties that allows it to adhere to the frame and the casing so as to form a singular integrated structure, as for example, the top case 124 or the bottom case 126.

As shown in FIG. 11A, a liquid glue 200" is dispensed on the top frame 154, and more particularly the flanged portion 164 of the top frame 154. The liquid glue 200" is generally dispensed through a nozzle 270 onto the exposed surface 202 (i.e., not the conductive surface 190) of the top frame 154. By way of example, the liquid glue 200" may be dispensed through the nozzle 270 via a handheld applicator or via a robotically controlled applicator tool. Nozzles are conventional and well known in the art and for the sake of brevity will not be discussed in greater detail. In most cases, the glue is applied along a predetermined path (either robotically or by hand) that generally corresponds to the areas of desired contact between the frame and the casing. In context of the top case 124 (as shown in FIG. 6), the liquid glue 200" is applied to the interface between the recessed portion 166 of the top plate 152 and the flanged portion 164 of the top frame 154. In context of the bottom case 126 (as shown in FIG. 8), the glue is applied to the interface between the bottom surface 220 of the bottom plate 156 and the flanged portion 224 of the bottom chassis 158 (including the flanged rib 236).

After dispensing the glue, the process flow proceeds to step 502 where a force is applied to sandwich the glue between the frame and the casing. For instance, after dispensing the glue, the casing is placed over the frame and pushed into contact with the glue, which is disposed on the surface of the frame. As shown in FIG. 11B, a force F is applied to the top plate 152 thereby squeezing the liquid glue 200" between the recessed portion 166 and the flanged portion 164. In most cases, this process is continued until the top surface 168 of the top plate 152 is flush with the top surface 170 of the top frame 152, i.e., the surfaces 168, 170 are planar. The amount of glue 200" applied to the interface generally depends on the size of the recessed portion 166 and the gap formed between a surface 204 of the recessed portion 166 and a surface 202 of the flanged portion 164 when the surfaces 168 and 170 are made flush. As should be appreciated, it is generally desirable to fill this area so as to form a sufficient bond.

After applying the force, the process flow proceeds to step 504 where the glue is allowed to set, thus placing the frame and casing in a predetermined position relative to one another. As shown in FIG. 11C, the liquid glue 200" changes into a solid binder 200, thus forming an integrated structure, i.e., top case 124. Furthermore, as mentioned previously, the predetermined position is generally a position that places the surfaces 168 and 170 planar, i.e., flush, with one another. The set time is generally dependent on the type of glue used to bind the two disparate parts together.

Figure 12:
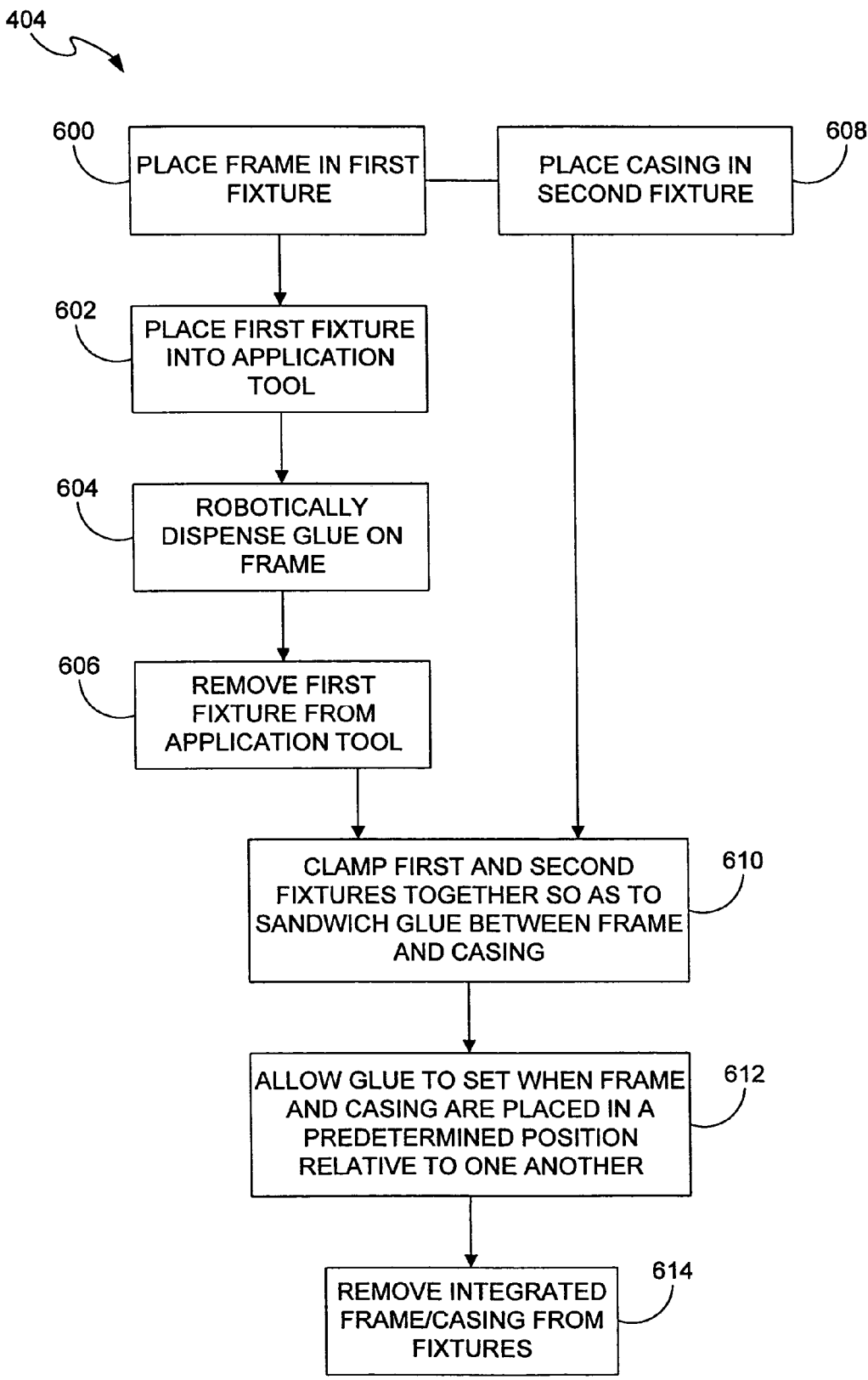
FIG. 12 is a flow diagram showing a method for structurally bonding a frame to a casing, in accordance with one embodiment of the present invention.

FIG. 12 is a flow diagram illustrating a method for structurally coupling a frame to a casing, in accordance with another embodiment of the present invention. As should be appreciated, the casings (e.g., top plate 152 and bottom plate 156) and the frames (e.g., top frame 154 and bottom chassis 158) must be glued together via an accurate and repeatable process. Generally speaking, the assemblies can only be glued once and typically none of the parts are recoverable.

As such, FIG. 12 describes a process that uses a highly precise first fixture to position a frame or casing during gluing, a robotically controlled nozzle to precisely place the glue along a predetermined path of a frame or casing, and a highly precise second fixture working with the first fixture to precisely position the frame relative to the casing during curing. In most cases, the fixtures are configured to adjust for tolerances in the frame and casing, and thus the fixtures define the tolerances of the final assembly.

The method 404 generally begins at step 600 where the frame is placed in a highly geometrically accurate first fixture. By way of example, the first fixture may be machined to make its dimensions highly accurate. The first fixture is preferably designed to securely hold the frame therein, and to hold the frame in a fixed position relative to a reference element of the fixture. By way of example, the reference element may be a surface or protrusion that is configured to contact a specific location(s) on the frame to hold the frame in the X, Y and/or Z directions. In one embodiment, a part or parts of the frame are arranged to locate flush against a datum surface(s) in the first fixture. As such, the critical controlling geometries of the assembly (E.g., top case or bottom case) are determined directly by the precision machining of the first fixture. In one implementation, the first fixture includes a planar reference surface configured for abutting a planar surface of the frame. By way of example, and referring to FIG. 11A, the top surface 170 of the top frame 154 may be precisely positioned on a planar reference surface 271 of a fixture 272 so as to place the exposed surface 202 in a known position.

After the frame is placed in the first fixture, the process flow proceeds to step 602 where the first fixture is placed into an application tool. Broadly, the application tool is arranged for automatically dispensing a glue along a predetermined path relative to the frame. More specifically, the application tool includes a stage, a nozzle, and a robot. Although not shown, the stage is configured to support and receive the first fixture so as to precisely hold the fixture in the X, Y and Z directions. In most cases, the stage is positioned below the nozzle in the Z-direction. The nozzle is configured to dispense the glue onto the surface of the frame when the fixture is securely held by the stage. In most cases, the nozzle dispenses the glue in the Z-direction (as shown in FIG. 11A). Furthermore, the robot is configured to move the nozzle within a single plane relative to the frame, i.e., the robot moves the nozzle in both the X and Y directions. The application tool also includes a controller for controlling the movements of the robot, and thus the location of the nozzle.

After the first fixture is placed in the application tool, the process flow proceeds to step 604 where a glue is robotically dispensed onto the frame. The glue is generally arranged for structurally bonding the frame to the casing. That is, the glue has properties that allows it to adhere to the frame and the casing so as to form a singular integrated structure, as for example, the top case 124 or the bottom case 126. In one embodiment, the application tool is preprogrammed so that the nozzle is automatically moved (via the robot) relative to the frame. By way of example, the robot may be preprogrammed to move in the X & Y directions so as to follow the perimeter of the top frame 154, and more particularly the flanged portion 164 of the top frame 154. After the glue is dispensed, the process flow proceeds to step 506 where the first fixture is removed from the application tool.

During steps 600 to 606, the process flow continues in a separate sequence (in parallel to steps 600–606) to step 608 where the casing is placed in a highly geometrically accurate second fixture. By way of example, the second fixture may be machined to make its dimensions highly accurate. The second fixture is preferably designed to securely hold the casing therein, and to hold the casing in a fixed position relative to a reference element of the fixture. By way of example, the reference element may be a surface or protrusion that is configured to contact a specific location(s) on the frame to hold the frame in the X, Y and/or Z directions. In one embodiment, a part or parts of the frame are arranged to locate flush against a datum surface(s) in the second fixture. As such, the critical controlling geometries of the assembly are determined at least by the precision machining of the second fixture. In one implementation, the first fixture includes a planar reference surface configured for abutting a planar surface of the casing. By way of example, and referring to FIG. 11B, a bottom surface 169 of the top plate 154 may be positioned on a reference surface 275 of a second fixture 274 so as to place the exposed surface 204 in a known position.

After steps 606 and 608 are completed, the process flow proceeds to step 610 where the first and second fixtures are clamped together. The two fixtures are configured to mate with each other so as to locate all the various parts of the frame and housing. In one embodiment, the first and second fixtures are configured for engagement so as to precisely place the frame relative to the casing in the X and Y directions, and to sandwich the glue between the frame and the casing in the Z direction. By way of example, the first fixture may be a lower fixture that includes guides, and the second fixture may by an upper fixture that includes guide holes that cooperate with the guides, and wherein the guides and guide holes position the fixtures relative to one another in the X & Y directions, and allow movement of the fixtures in the Z-direction.

As shown in FIG. 11B, when the force F is applied to the fixtures 272, 274, the fixtures 272, 274 are made to move towards one another thus forcing the top plate 152 to move towards the top frame 154. As the top plate 152 moves towards the top frame 154, the recessed portion 166 comes into contact with the liquid glue 200", and under further force squeezes the liquid glue 200" between the surface 204 of the recessed portion 166 and the surface 202 of the flanged portion 164. This process is continued until the top surface 168 of the top plate 152 abuts the reference surface 271 of the first fixture 272 thereby ensuring that the top surface 168 of the top plate 152 is made flush with the top surface 170 of the top frame 152. The amount of glue 200" applied to the interface generally depends on the size of the recessed portion 166 and the gap formed between the surface 204 of the recessed portion 166 and the surface 202 of the flanged portion 164 when the surfaces 168 and 170 are made flush. As should be appreciated, it is generally desirable to fill this area so as to form a sufficient bond.

After the fixtures are clamped, the process flow proceeds to step 612 where the glue is allowed set, thus placing the frame and casing in a predetermined position relative to one another. As shown in FIG. 11C, the liquid glue 200" changes into a solid binder 200, thus forming an integrated structure, i.e., top case 124. Furthermore, as mentioned previously, the predetermined position is generally a position that places the surfaces 168 and 170 planar, i.e., flush, with one another. The set time is generally dependent on the type of glue used to bind the two parts together. After the glue has set, the process flow proceeds to step 514 where integrated frame/casing structure is removed from the first and second fixtures.

As should be appreciated, any geometric variations in the frame and/or casing is completely absorbed in the thickness of the glue bond of the final assembly. The tolerance between datum surfaces on any part (excluding the final assembly) is the same as the standard machining tolerance on the first fixture or second fixture (e.g., +/−0.0005 mm). The tolerance between any of the combined parts is the root mean squared tolerance of the first and second fixtures together (+/−0.007 mm). Thus, the final glued assembly, though it represents parts made by different processes in many places by many vendors, ultimately has the geometric stability of a single machined part.

It is the tight tolerance and the repeatability that make this so advantageous. It uses the properties of the glue bond to eliminate tolerance deviations from adjacent or unique parts, thereby making the assembly much more precise than one in which tolerances stack. The repeatability comes from the use of the fixture(s) to drive the critical dimensions-every part coming off that fixture will have the tolerances of the fixture and thus they are repeatable. Glue also allows attachment locations to match very closely with other parts. That is, driving the tolerances so tight allows for a portable computer that is absolutely minimal. With tolerance of machined parts, the display assembly can be reduced to the minimum necessary.

Referring to FIGS. 13 and 14A–D a method 406 for electrically bonding the frame to the casing will be disclosed. FIG. 13 is a flow diagram, and FIGS. 14A–D are side elevation views of the frame and casing, illustrating the steps of the method, in accordance with one embodiment of the present invention. For ease of discussion, FIG. 14 corresponds to the embodiments shown in FIGS. 3 and 5–6. Thus, FIG. 14 is a side elevation view, in cross section, of the top case 124 including the top plate 152 (e.g., casing) and the top frame 154 (e.g., frame). However, it should be noted, that the following method can also be applied to the embodiments shown in FIGS. 4, 7–8 (e.g., bottom case 126). The method 406 generally begins at step 700 where a conductive paste is dispensed onto a conductive surface of the frame or casing. The paste is generally arranged for electrically bonding the frame to the casing. That is, the paste has properties that allows it to adhere to the frame and the casing so as to form a singular electrical element.

Figure 14A:
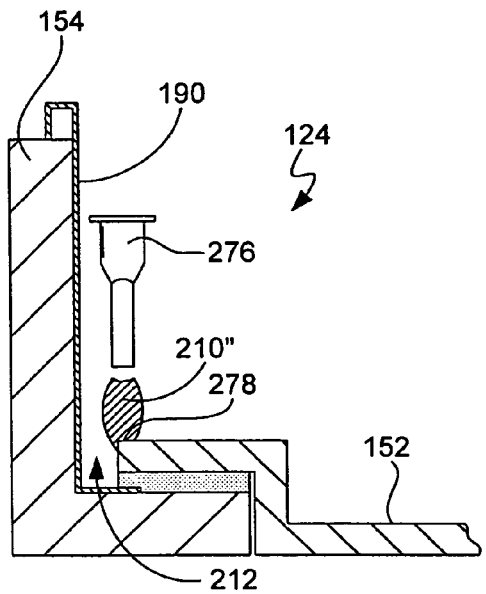
FIG. 14A–D are side views, in cross section, showing one method of electrically coupling a frame to a casing, in accordance with one embodiment of the present invention.

As shown in FIGS. 14A & B, a liquid paste 210" is dispensed on the top plate 152, and more particularly the recessed portion 166 of the top plate 152. The liquid paste 210" is generally dispensed through a nozzle 276 onto the edge 278 of the top plate 152. By way of example, the liquid paste 210" may be dispensed through the nozzle 276 via a handheld applicator or via a robotically controlled applicator tool. Nozzles are conventional and well known in the art and for the sake of brevity will not be discussed in greater detail. In most cases, the paste is applied along a predetermined path (either robotically or by hand) that generally corresponds to the areas of desired contact between the frame and the casing. In context of the top case 124 (as shown in FIGS. 5&6), the liquid paste 210" is applied so as to the fill the gap 212 between the recessed portion 166 of the top plate 152 and the conductive layer 190 of the top frame 154. In context of the bottom case 126 (as shown in FIGS. 7&8), the paste is applied so as to fill the gap 262 between the bottom surface 220 of the bottom plate 156 and the conductive layer 240 of the bottom chassis 158 (including the flanged rib 236).

In one embodiment, the nozzle is moved relative to the final assembly so as to seal the perimeter of the interface between the frame and the casing. As shown in FIG. 5, the entire interface between the conductive portion 190 and the recessed portion 166 is filled with the conductive paste 210.

As shown in FIG. 7, the entire interface between the conductive portion 240 and the bottom surface 220 is filled with the conductive paste 260. It should be noted, however, that this is not a limitation and that the method described herein can also be applied to specific regions of an enclosure having increased emissions. By way of example, the conductive paste may be applied to I/O areas, card slots and the like. Moreover, it should also be noted that the nozzle does not have to follow a straight pattern. For example, it may be desirable to move around a certain area or object, i.e., may cause cosmetic problems by seaping through an opening. In one implementation, and referring to FIG. 4, the conductive paste 210 is dispensed around a first boss 280 and a second boss 282. In another implementation, and referring to FIG. 7, the conductive paste 260 is dispensed around the opening 232 and protrusions 288 and 299.

Figure 14B:
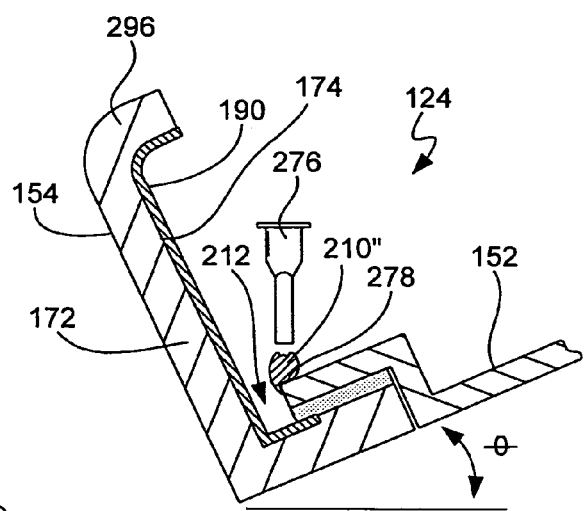

In some cases it may be difficult to reach the gap 212 because of obstructions along the predetermined path. By way of example, the frame or casing may include a protrusion that extends into the desired pathway thus obstructing the movement of the nozzle. This is generally more of a concern when using a robotically controlled nozzle. As shown in FIG. 14B, the wall 172 of the top frame 154 includes a protrusion 296 that extends past the inner periphery 174 of the wall 172. In one embodiment, the top case 124 may be configured to tilt at an angle θ to overcome the obstruction. That is, the top case 124 may be tilted to allow the upright needle to continue its movements without impediments. Additionally or alternatively, the needle itself may be configured to apply paste at an angle.

After the paste is dispensed, the process flow proceeds to step 702 where the conductive paste is caused to flow from the conductive surface of the frame to the conductive surface of the casing or vice versa. In one embodiment, the needle is centered on the edge of the frame so that the conductive paste first engages a conductive portion of the frame and then flows down the side of the frame via gravity to a conductive portion of the casing (e.g., bottom case 126). In another embodiment, the needle is centered on the edge of the casing so that the conductive paste first engages a conductive portion of the casing and then flows down the side of the casing via gravity to a conductive portion of the frame (e.g., top case 124). As should be appreciated, gravity is the only force needed to apply the conductive paste, i.e., the paste is put on as a liquid and allowed to flow. Because of this, the process of applying the conductive paste does not need additional compressive forces from such items as screws, fasteners, and the like.

Figure 14C:
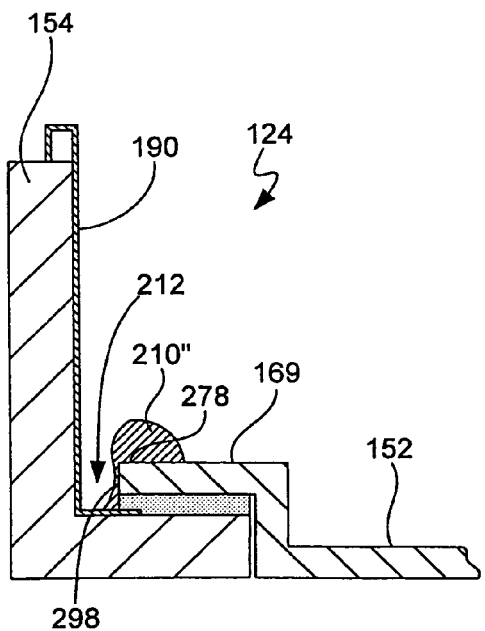

As shown in FIG. 14C, the dispensed liquid paste 210" begins to flow from the point of application (e.g., the corner 278 of the recessed portion 166) to a point beneath the point of application (e.g., the gap 212) via the force of gravity. In general, as the paste 210" moves, the paste 210" adheres to the bottom surface 169 of the recessed portion 166, the side edge 298 of the recessed portion 166 disposed below the top surface, and the conductive layer 190 disposed below the side edge 298. It should be noted, however, that this is not a limitation and that the paste may be applied at other locations so much as the liquid paste adheres to a conductive surface of the top plate and a conductive surface of the top frame while filling the gap therebetween.

Figure 14D:
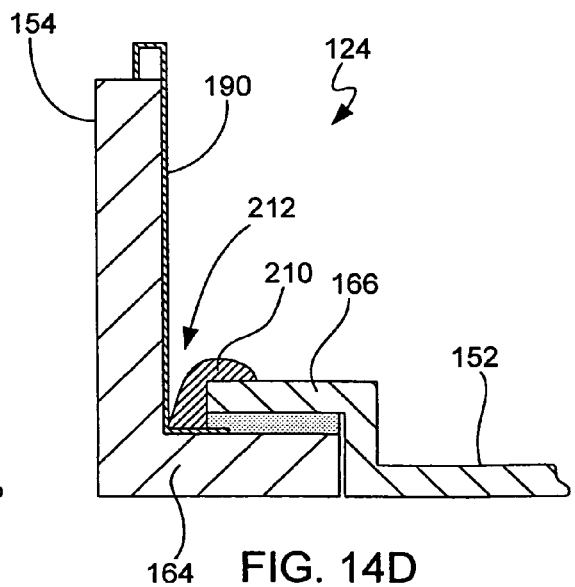

After the paste is caused to flow, the process flow proceeds to step 704 where the conductive paste is allowed to set so as to electrically seal a gap found between the conductive surfaces of the frame and casing. As shown in FIG. 14D, the liquid paste 210" filled the gap 212 between the recessed portion 166 and the conductive layer 190, and solidified to form the conductive bridge 210 that electrically connects the conductive top plate 152 to the conductive layer 190 of the non-conductive top frame 154.

In a preferred embodiment of the invention, the conductive paste is dispensed in a robotically controlled application tool. The application tool is generally arranged for automatically dispensing a paste along a predetermined path relative to the final assembly. Robotically dispensed paste allows material to be strategically placed, reduces waste and reduces sample to sample variations. As such, the casings and the frames can be electrically connected via an accurate and repeatable process.

Figure 15:
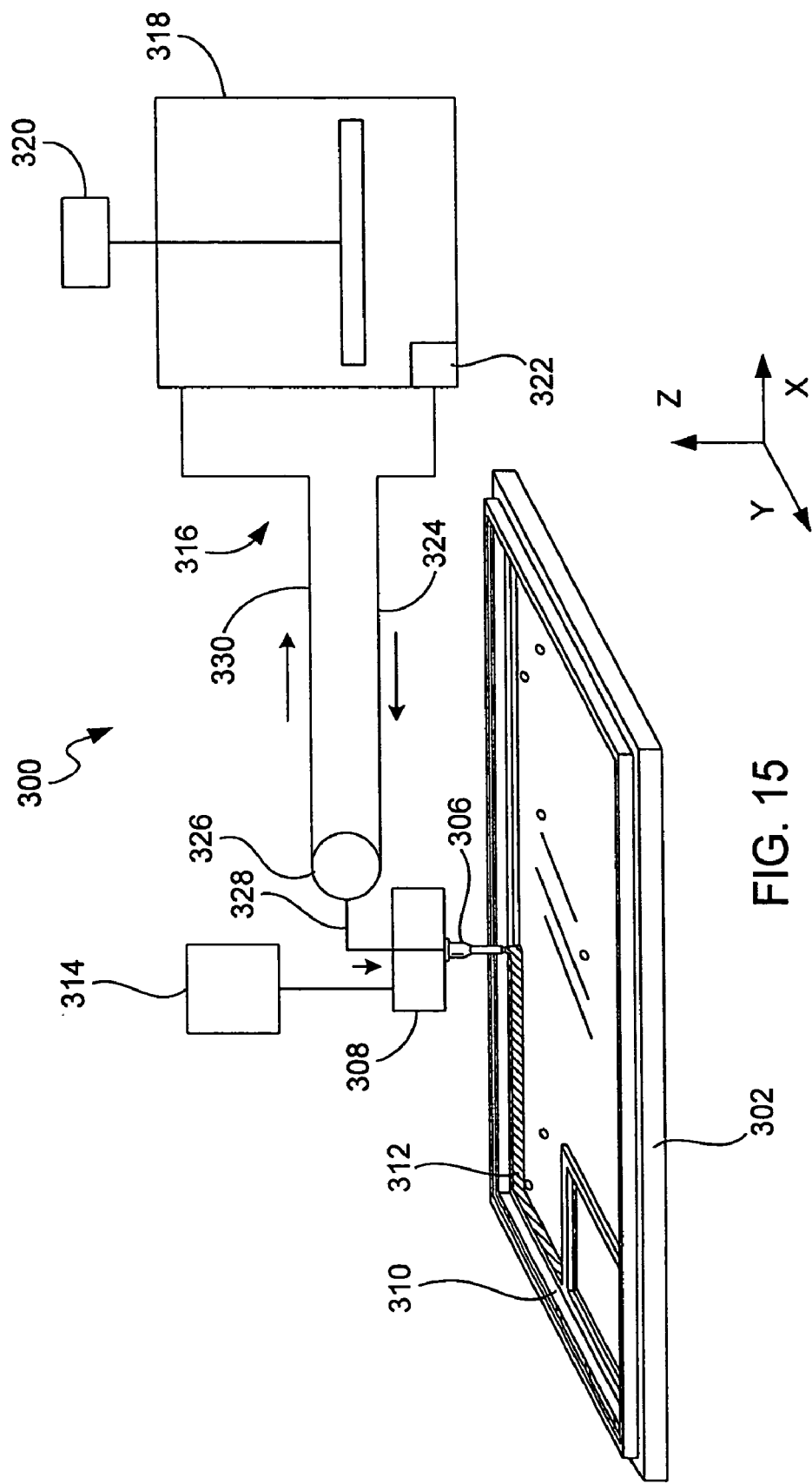
FIG. 15 is a block diagram of a conductive paste applicator tool, in accordance with one embodiment of the present invention.

To facilitate discussion, FIG. 15 shows a robotically controlled application tool 300, in accordance with one embodiment of the invention. The application tool 300 generally includes a fixture 302, a nozzle 306, and a robot 308. The fixture 302 is configured to securely hold an assembly 310 therein, and to hold the assembly 310 in a fixed position relative to a reference element of the fixture 302. In most cases, the fixture 302 is configured to precisely hold the assembly 310 in the X, Y and Z directions. Furthermore, the fixture 302 is generally positioned below the nozzle 306 in the Z-direction. The nozzle 306 is configured to dispense a conductive paste 312 onto the surface of the final assembly 310. In most cases, the nozzle 306 dispenses the paste 312 in the Z-direction. Furthermore, the robot 308 is configured to move the nozzle 306 within a single plane relative to the fixture 302, and more particularly the assembly 310, i.e., the robot moves the nozzle in both the X and Y directions. The application tool 300 also includes a controller 314 for controlling the movements of the robot 308, and thus the location of the nozzle 306.

As should be appreciated, the nozzle 306 may be the nozzle 276 (as shown in FIG. 14), the assembly 310 may be the top case 124 or the bottom case 126, and the conductive paste 312 may be the conductive paste 210 or 260 as shown in FIGS. 3–8.

In one embodiment, the application tool 300 also includes a dispensing mechanism 316 for supplying the paste 312 to the nozzle 306, and for keeping the paste 312 mixed up so as to reduce separation between the conductive agent and the carrying agent. The dispensing mechanism 316 generally includes a holding tank 318, an agitator 320, a pump 322, a supply line 324, a valve 326, a feed line 328, and a return line 330. The tank 318 is configured to hold the conductive paste 312. The pump 322 is configured to continuously pump the paste to and from the tank 318. The agitator 320 is configured to keep the conductive particles suspended and evenly mixed. By way of example, the agitator 320 may be a stirring device. The supply line 324 is configured to deliver the paste 312 to the valve 326. As such, the supply line 324 has in inlet coupled to the tank 318 and an outlet coupled to the valve 326.

The valve 326 is configured to regulate the flow of the paste 312 to the feed line 328 and the return line 330. In general, the valve 326 has a first condition, flowing the paste 312 to the nozzle 306 through the feed line 328, and a second condition, flowing the paste 312 back to the holding tank 318 through the return line 330. In most cases, the valve 326 is biased in the second condition so as to keep the paste 312 continuously flowing when the paste 312 is not being dispensed through the nozzle 306. By way of example, the valve 326 may be a diverter valve. The feed line 328 is configured to deliver the paste 312 to the nozzle 306 so that the paste 312 can be dispensed on the assembly 310. As such, the feed line 328 has an inlet coupled to the valve 326 and an outlet coupled to the nozzle 306. The return line 330, on the other hand, is configured to deliver the paste 312 back to the holding tank 318. As such, the return line 330 has an inlet coupled to the valve 326 and an outlet coupled to the holding tank 318. In one embodiment, the controller 314 is also configured to control the dispensing mechanism 316, as for example, the valve 326, agitator 320, and pump 322.

While this invention has been described in terms of several preferred embodiments, there are alterations, permutations, and equivalents, which fall within the scope of this invention. For example, although the present invention has been described as using a structural glue and conductive paste to assemble metal to plastic, it should be noted that it can also be used to assemble plastic to plastic or metal to metal. Furthermore, although the present invention has been described as using molded plastic and formed sheet metal, it should be noted that it can also be used in a wide range of manufactured parts including, die cast metal, extruded metal, thixo-molded metal, ceramics and the like. It should also be noted that there are many alternative ways of implementing the methods and apparatuses of the present invention. For example, the methods of the present invention can also be applied to other parts of the enclosure such as structural components located inside the frame and casing. It is therefore intended that the following appended claims be interpreted as including all such alterations, permutations, and equivalents as fall within the true spirit and scope of the present invention.

What is claimed is:

1. A method of forming a housing of a consumer electronic product by structurally bonding a first housing member to a second housing member, the housing enclosing internally therein operational components of the consumer electronic product, said method comprising:
    dispensing a glue between the first and second housing members;
    placing the first housing member in a first fixture;
    placing the second housing member in a second fixture;
    clamping the first and second fixtures together so as to sandwich the glue between the first and second housing members; and
    allowing the glue to cure when the first and second housing members are placed in a predetermined position relative to one another so as to form a singular composite structure.

2. The method as recited in claim 1 wherein the step of dispensing the glue comprises:
    placing the first housing member into a robotically controlled application tool configured for dispensing the glue along a predetermine path; and
    robotically dispensing the glue on the first member.

3. The method as recited in claim 1 wherein the first fixture is arranged to hold the first member in a fixed position relative to a first reference element of the first fixture, and wherein the second fixture is arranged to hold the second member in a fixed position relative to a second reference element of the second fixture.

4. The method as recited in claim 3 wherein during placing of the first member a first portion of the first member is arranged to locate flush against a first datum surface of the first fixture, and wherein during placing of the second member a second portion of the second member is arranged to locate flush against a datum second surface of the second fixture.

5. The method as recited in claim 3 wherein the first and second fixtures are arranged to mate with each another so as to locate the first portion of the first member relative to the second portion of the second member.

6. The method as recited in claim 3 wherein the first and second fixtures place the first portion substantially flush with the second portion.

7. The method as recited in claim 3 wherein the first and second fixtures place the first portion in a predetermined offset position relative to the second portion.

8. A method as recited in claim 1, wherein the first and second members are arranged to form a gap for the placement of the glue.

9. The method as recited in claim 8 wherein the glue is arranged to absorb geometric variations found in the first and second members so as to meet a predetermined geometry of the single composite structure.

10. A method as recited in claim 1, wherein the first member is formed from a first material, and wherein the second member is formed from a second material that is different than the first material.

11. The method as recited in claim 1 wherein the glue is a two part epoxy.

12. The method as recited in claim 1 wherein the consumer electronic product is a computing device.

13. The method as recited in claim 12 wherein the computing device is a portable computer including a base and a lid, and wherein the first and second housing members work together to form at least a portion of the housing of the base or at least a portion of the housing of the lid.

14. The method as recited in claim 10 wherein the first member is formed from a plastic material, and wherein the second member is formed from a metallic material.

15. The method as recited in claim 14 wherein the first member is formed from carbon fiber, and the second structural member is formed from titanium.

16. A method of forming a housing of a consumer electronic product by electrically bonding a first housing member to a second housing members the first and second housing members enclosing internally therein operational components of the consumer electronic product, said method comprising:
    dispensing a conductive paste onto a first conductive surface of the first housing member, the conductive paste being a metal filled electrically conductive ink;
    flowing the conductive paste from the first conductive surface of the first housing member to a second conductive surface of the second housing member; and
    allowing the conductive paste to cure so as to electrically seal an interface between the first and second conductive surfaces of the first and second housing members.

17. The method as recited in claim 16 wherein the conductive paste is dispensed along a predetermined path that corresponds to the area of desired electrical contact between the first and second housing members.

18. The method as recited in claim 16 wherein gravity is used to flow the conductive paste from the first conductive surface of the first member to the second conductive surface of the second member.

19. The method as recited in claim 16 wherein the first housing member is formed from a first material, and wherein the second housing member is formed from a second material that is different than the first material.

20. The method as recited in claim 19 wherein the first housing member is formed from a conductive material, wherein the second housing member is formed from a non-conductive material that is selectively coated with a conductive layer, and wherein the conductive paste electrically connects and electrically seals an interface between the conductive material of the first housing member and the conductive layer of the second housing member.

21. The method as recited in claim 16 wherein the step of dispensing is implemented in a robotically controlled application tool.

22. The method as recited in claim 16 wherein the first housing member is formed from a first metallic material, wherein the second housing member is formed from a plastic material, and wherein the conductive layer is formed from a second metallic material.

23. The method as recited in claim 22 wherein the plastic material is a carbon fiber plastic, the second metallic material is a nickel plated layer, and the metallic material is titanium sheet metal.

24. The method as recited in claim 16 wherein the metal filled electrically conductive ink is a nickel filled electrically conductive ink.

25. The method as recited in claim 24 wherein the nickel filled electrically conductive ink has viscosity between about 5000 centipoise to about 10000 centipoise.

26. The method as recited in claim 16 further comprising:
    selectively coating the interior surface of at least one of the housing members with a conductive material in order to form the conductive surface of the housing member, the conductive material being configured for shielding electronic emissions.

27. The method as recited in claim 26 wherein the step of selectively coating is performed via a plating, painting or deposition process.

28. The method as recited in claim 16 wherein the consumer electronic product is a computing device.

29. The method as recited in claim 28 wherein the computing device is a portable computer including a base and a lid, and wherein the first and second housing members work together to form at least a portion of the housing of the base or at least a portion of the housing of the lid.

* * * * *